US010043224B2

(12) United States Patent
Monforte et al.

(10) Patent No.: US 10,043,224 B2
(45) Date of Patent: Aug. 7, 2018

(54) UNIFIED FRAMEWORK FOR ELECTRICAL LOAD FORECASTING

(71) Applicant: Itron, Inc., Liberty Lake, WA (US)

(72) Inventors: Frank Anthony Monforte, Encinitas, CA (US); Christine Ann Fordham, San Diego, CA (US)

(73) Assignee: Itron, Inc., Liberty Lake, WA (US)

( * ) Notice: Subject to any disclaimer, the term of this patent is extended or adjusted under 35 U.S.C. 154(b) by 1410 days.

(21) Appl. No.: 13/931,583

(22) Filed: Jun. 28, 2013

(65) Prior Publication Data

US 2014/0156322 A1 Jun. 5, 2014

Related U.S. Application Data

(60) Provisional application No. 61/682,081, filed on Aug. 10, 2012.

(51) Int. Cl.
*G06Q 50/06* (2012.01)
*H02J 3/00* (2006.01)

(52) U.S. Cl.
CPC ........ *G06Q 50/06* (2013.01); *H02J 2003/003* (2013.01); *Y04S 10/54* (2013.01)

(58) Field of Classification Search
CPC ..... G06Q 50/06; H02J 2003/003; Y04S 10/54
USPC ........................................................ 700/291
See application file for complete search history.

(56) References Cited

U.S. PATENT DOCUMENTS

| 8,260,738 B2 * | 9/2012 | MacLennan ............ G06F 17/18 706/59 |
| 2008/0103751 A1 | 5/2008 | Hsiung et al. |
| 2010/0079603 A1 | 4/2010 | Antsfeld |
| 2011/0029141 A1 * | 2/2011 | Sun .......................... H02J 3/00 700/291 |

(Continued)

FOREIGN PATENT DOCUMENTS

WO    WO2012060883 A2    5/2012

OTHER PUBLICATIONS

Office action for U.S. Appl. No. 13/931,646, dated Nov. 16, 2015, Monforte et al., "Near-Term Data Filtering, Smoothing and Load Forecasting", 32 pages.

(Continued)

*Primary Examiner* — Robert E Fennema
*Assistant Examiner* — Christopher W Carter
(74) *Attorney, Agent, or Firm* — Lee & Hayes, PLLC

(57) ABSTRACT

Techniques for near-term data filtering, smoothing and forecasting are described herein. In one example, data is received from supervisory control and data acquisition (SCADA) measurements available in an electrical grid. The data may be filtered according to a two-stage Kalman filter, which may include a ramp rate filter test and a load level filter test. The filtered data may then be smoothed according to an augmented Savitzky-Golay filter. Within the filter, a lift multiplier may correct for bias, which may have been introduced by load changes (e.g., an early morning increase in load). In one example, the lift multiplier may be calculated as a ratio between a smoothed load from a centered Savitzky-Golay moving average and a right hand side constrained Savitzky-Golay moving average. The filtered and smoothed data may be used in forming near-term forecast(s), which may be performed by autoregressive model(s).

19 Claims, 21 Drawing Sheets

(56) References Cited

U.S. PATENT DOCUMENTS

| | | | |
|---|---|---|---|
| 2012/0096552 A1* | 4/2012 | Paek | G06F 21/552 726/23 |
| 2012/0173174 A1 | 7/2012 | Gaarder | |
| 2012/0296482 A1 | 11/2012 | Steven et al. | |
| 2013/0140820 A1* | 6/2013 | Tarnowski | F03D 7/0284 290/44 |
| 2014/0289004 A1 | 9/2014 | Monforte et al. | |

OTHER PUBLICATIONS

Candan, et al., A unified framework for derivation and implementation of Savitzky-Golay filters, publishedby Science direct on Apr. 21, 2014, 9 pages.

Office action for U.S. Appl. No. 13/931,646, dated Sep. 1, 2016, Monforte et al., "Near-Term Data Filtering, Smoothing and Load Forecasting", 14 pages.

Ahnert, et al., "Numerical differentiation of experimental data: local versus global methods", ScienceDirect, Computer Physics Communications 177, Elsevier, 2007, pp. 764-774.

Monforte, "A Unified Framework for Near-term and Short-term Load Forecasting", Itron white paper, 2009, pp. 1-21.

Office Action for U.S. Appl. No. 13/931,646, dated Apr. 21, 2015, Frank Anthony Monforte, "Near-Term Data Filtering, Smoothing and Load Forecasting", 27 pages.

Savitzky, et al., "Smoothing and Differentiation of Data by Simplified Least Squares Procedures", Analytical Chemistry, The Perkin-Elmer Corp, Norwalk, Conn, vol. 36, No. 8, Jul. 1964, pp. 1627-1639.

Wu, et al., "Adaptive Workload Prediction of Grid Performance in Confidence Windows", IEEE Transactions on Parallel and Distributed Systems, vol. 21, No. 7, Jul. 2010, pp. 925-938.

Office action for U.S. Appl. No. 13/931,646, dated Aug. 10, 2015, Monforte, et al., "Near-Term Data Filtering, Smoothing and Load Forecasting", 33 pages.

Office action for U.S. Appl. No. 13/931,646, dated Apr. 14, 2016, Monforte et al. , "Near-Term Data Filtering, Smoothing and Load Forecasting", 36 pages.

\* cited by examiner

UNIFIED FRAMEWORK FOR ELECTRICAL LOAD FORECASTING

RELATED APPLICATIONS

This patent application claims priority to U.S. patent application 61/682,081, titled, "Unified Framework for Electrical Load Forecasting," filed on 10 Aug. 2012, commonly assigned herewith, and hereby incorporated by reference.

BACKGROUND

Forecasting power requirements for an electrical grid is a complex task. A forecast that underestimates demand may result in a brown-out or a blackout. A forecast that overestimates demand may result in generation of unused power at considerable expense.

System operators may rely on short-term (e.g., next-day to ten days ahead) hourly load forecasting to set the day-ahead generation schedule for meeting tomorrow's loads. Known techniques for short-term forecasting focuses on the use of neural networks to produce day-ahead load forecasts. The premise for such techniques is that neural networks are well suited to the problem of modeling the nonlinear relationship between system loads and weather.

Unfortunately, known technology does not provide precise near-term (e.g., five-minute ahead to one hour-ahead) real-time load forecasts, such as at the five-minute level of load resolution. During this near-term range, system operators make critical operating decisions, including selection of generation units to be dispatched to meet system demand. While statistical modeling may forecast the short-term demand, a system operator may manually craft a near-term load forecast.

Next-day and near-term load forecasts are often developed by different groups within the organization. As the day unfolds, system operators make adjustments to the generation schedule that was set during the previous day to account for projected near-term system imbalances. In most cases, these real-time adjustments do not feed forward to help set the next-day forecast. Thus, many system operators are left with a mixed bag of forecasting techniques and no means of producing a single operational forecast that runs from five minutes ahead to several days ahead.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

This disclosure describes techniques for providing near-term and short-term load forecasting for an electrical network and/or grid. Near-term forecasting may include forecasting having a horizon (i.e., furthest extent of the forecast) that is one hour or less, while short-term forecasting may begin one day ahead (in the future) and have a horizon that is approximately ten days ahead. The techniques discussed herein provide a forecasting framework that produces five-minute level load forecasts for forecast horizons from five minutes ahead to several days ahead. The forecasts support day-ahead generation scheduling and day-of generation dispatching. The techniques address two key challenges to system load forecasting: (1) preventing erroneous and noisy Supervisory Control and Data Acquisition (SCADA) measurements from decreasing forecast accuracy and increasing forecast instability, and (2) developing accurate near-term and short-term forecasts, given forecasts of calendar, solar, economic, and weather conditions. Additionally, the techniques disclose a unified framework for near-term and short-term forecasting, which in one example combines three different forecasting models.

The discussion herein includes several sections. Each section is intended to include one or more examples of techniques and/or structures, but is not intended to include limitations, such as indications of elements which must be used and/or performed. A section entitled "Example Network" discusses aspects of an electrical grid, the user of SCADA data, data filters and a unified framework for forecasting. A section entitled "Data Filtering and Smoothing" discusses aspects of data filtering and smoothing, and their application to near-term and short-term electrical system load forecasting. A section entitled "Two-Stage Modified Kalman Filter" illustrates and describes aspects that modify a Kalman filter to allow utilization of observed electrical loads when the data are good, and model predicted loads when the data are outliers. A section entitled "Augmented Savitzky-Golay Filter" illustrates and describes aspects that can be used to improve forecast stability by dampening random fluctuations in filtered data. A section entitled "Example Unified Framework" illustrates and describes blending a plurality of forecasts and/or models having utility for different ranges in the future, and bridging the gap(s) between them. A section, entitled "Example Methods," discusses example techniques by which the filters and framework previously introduced may be utilized. Finally, the discussion ends with a brief conclusion. This brief introduction is provided for the reader's convenience and is not intended to describe and/or limit the scope of the claims or any section of this disclosure.

Example Network

Figure 1:
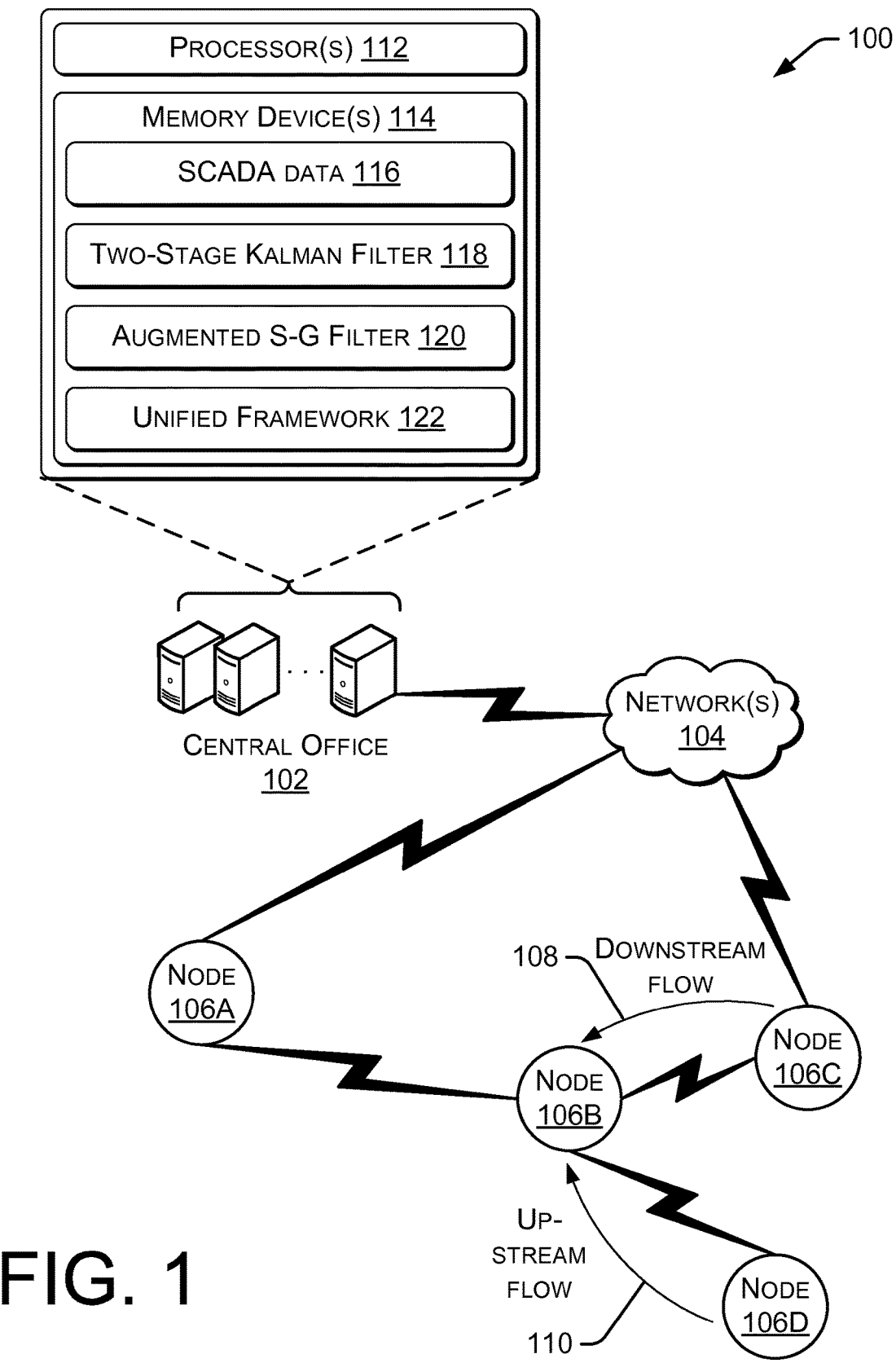
FIG. 1 is a diagram illustrating an example network within which load forecasting may be utilized.

FIG. 1 is a diagram showing an example network 100, which may comprise a central office 102, a network 104 (e.g., the Internet) and a plurality of nodes 106A-106D. The example network 100 is provided as a specific instance to illustrate more general concepts of electrical load forecasting, and not to indicate required and/or necessary elements. The network 100 may be configured as an electrical distribution and/or communications network. In one example, the network 100 may be configured as a smart grid, such as an advanced metering infrastructure (AMI) network including a number of utility meters having communication capabilities to support automatic meter reading (AMR).

The central office 102 may be implemented by one or more computing devices, such as servers, server farms, personal computers, laptop computers, etc. The one or more computing devices may be equipped with one or more processor(s) communicatively coupled to memory. In some examples, the central office 102 includes near-term data filtering, smoothing and load forecasting ability, which may include a unified framework for electrical load forecasting. For instance, the central office 102 may obtain SCADA data from the network 100, and use techniques described herein to provide electrical load forecasting and load level control and regulation (e.g., control of a spinning reserve). Although the example of FIG. 1 illustrates the central office 102 in a single location, in some examples the central office may be distributed amongst multiple locations and/or may be eliminated entirely (e.g., in the case of a highly decentralized distributed computing platform). The network(s) 104 may comprise a wireless or a wired network, or a combination thereof, such as the Internet. The network 104 may be a collection of discrete and/or interconnected networks, which may function as a single large network.

The network architecture 100 may include a plurality of nodes 106A, 106B, 106C, 106D, . . . 106N (collectively referred to as nodes 106) communicatively coupled to each other via direct communication RF signals, power line communication (PLC) links, or other types of transmissions and/or media. Some of the nodes may be associated with utility meters, transformers, substations, switching and/or control circuits, and electrical generation facilities, etc. In this example, N represents an example number of nodes in an AMI, which may be configured as a wide area network (WAN), metropolitan area network (MAN), local area network (LAN), neighborhood area network (NAN), personal area network (PAN), a combination of the foregoing, or the like. The nodes associated with utility meters may be associated with information regarding the consumption of electricity, natural gas, water or other consumable resources. The nodes associated with electrical generation facilities may be associated with information regarding power generation, consumption, monitoring, etc. In a further example, one or more nodes may be utilized to provide control information and/or to communicate with generation facilities.

Information may move within the network in both downstream flows 108 and upstream flows 110. The information may include Supervisory Control and Data Acquisition (SCADA) measurements, which may be used in managing the electrical grid and/or network 100.

In the example of FIG. 1, the central office 102 may include one or more processors 112 communicatively coupled to memory 114. The processor(s) 112 may execute, and the memory 114 may contain, various software statements, software modules, procedures, managers, algorithms, etc. Such functional blocks may be configured in software and/or firmware, and may be executable by the processor(s) 112. In alternative embodiments, any or all of the processor(s) 112, memory 114 and/or functional blocks or modules may be implemented in whole or in part by hardware. Examples of hardware include a microcontroller or other digital device, an application specific integrated circuit (ASIC) or other device configured to execute the described functions.

The memory 114, while shown as a monolithic entity, may also be configured as a plurality of similarly and/or differently configured devices, such as read-only memory, writable memory, persistent or non-persistent memory, etc. The memory 114 may be configured to store one or more software and/or firmware modules, which are executable by the processor(s) 112 to implement various functions. The memory 114 may comprise computer-readable media and may take the form of volatile memory, such as random access memory (RAM) and/or non-volatile memory, such as read only memory (ROM) or flash RAM. Computer-readable media includes volatile and non-volatile, removable and non-removable media implemented according to any technology or techniques for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. The memory and/or computer-readable media are non-transitory in nature, in that they persistently store instructions to support the functionality described herein.

For purposes herein, all or part of a computer-readable media may be included within an application specific integrated circuit (ASIC) or other hardware device. Such a hardware device may also include processor functionality and may be configured to perform functions consistent with bandwidth management in an AMI. Accordingly, within such an integrated circuit, one or more processors are configured with executable instructions, which may be defined by logic, transistors or other components, and/or memory.

In operation, the processor(s) 112 and memory 114 may receive, process and store SCADA data 116, which may be obtained from the network 100. The SCADA data 116, together with other input as indicated by circumstances, may be processed by a two-stage Kalman filter 118 and/or an augmented Savitzky-Golay smoothing filter 120. Various models used to predict electrical demand may be created, maintained and/or operated within a unified framework 122, which may be used as an input and/or control of a level of power generation.

Data Filtering and Smoothing

To dispatch electrical generation capacity (e.g., power plants) efficiently to meet system loads, system operators need an accurate five-minute load level forecast for a rolling one to six hour window. Ideally, this forecast would be updated every five minutes to reflect the most recent state of the system, as measured by the SCADA system. A first near-term forecasting challenge is the treatment of erroneous and noisy SCADA data.

Figure 2:
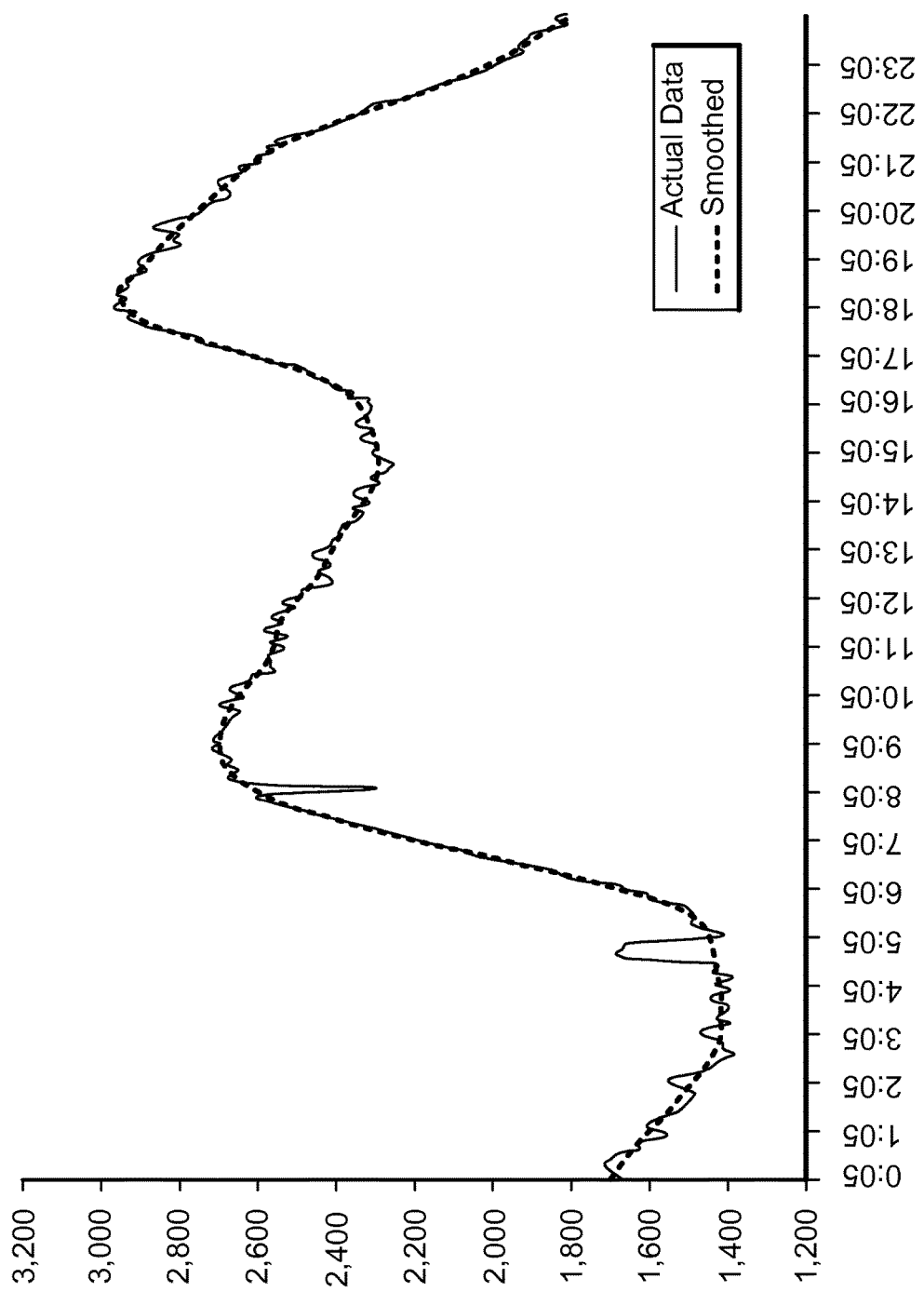
FIG. 2 is a graph illustrating an example of noisy versus smooth data.

FIG. 2 shows an example of noisy versus smoothed SCADA data, in which the solid line represents the noisy load data while the dashed line represents a corresponding smoothed data series. From a forecasting perspective, an advantageous situation is to have a smooth stream of five-minute data values feeding into a forecast model. A smooth data stream is particularly advantageous for use with autoregressive forecasting models that may echo into the forecast period any spikes or noise in the SCADA reads. Feeding a sequence of smooth five minute SCADA reads through an autoregressive forecasting model will lead to a smooth sequence of load forecasts. Conversely, noisy five-minute SCADA reads will lead to a noisy sequence of load forecasts.

Figure 3:
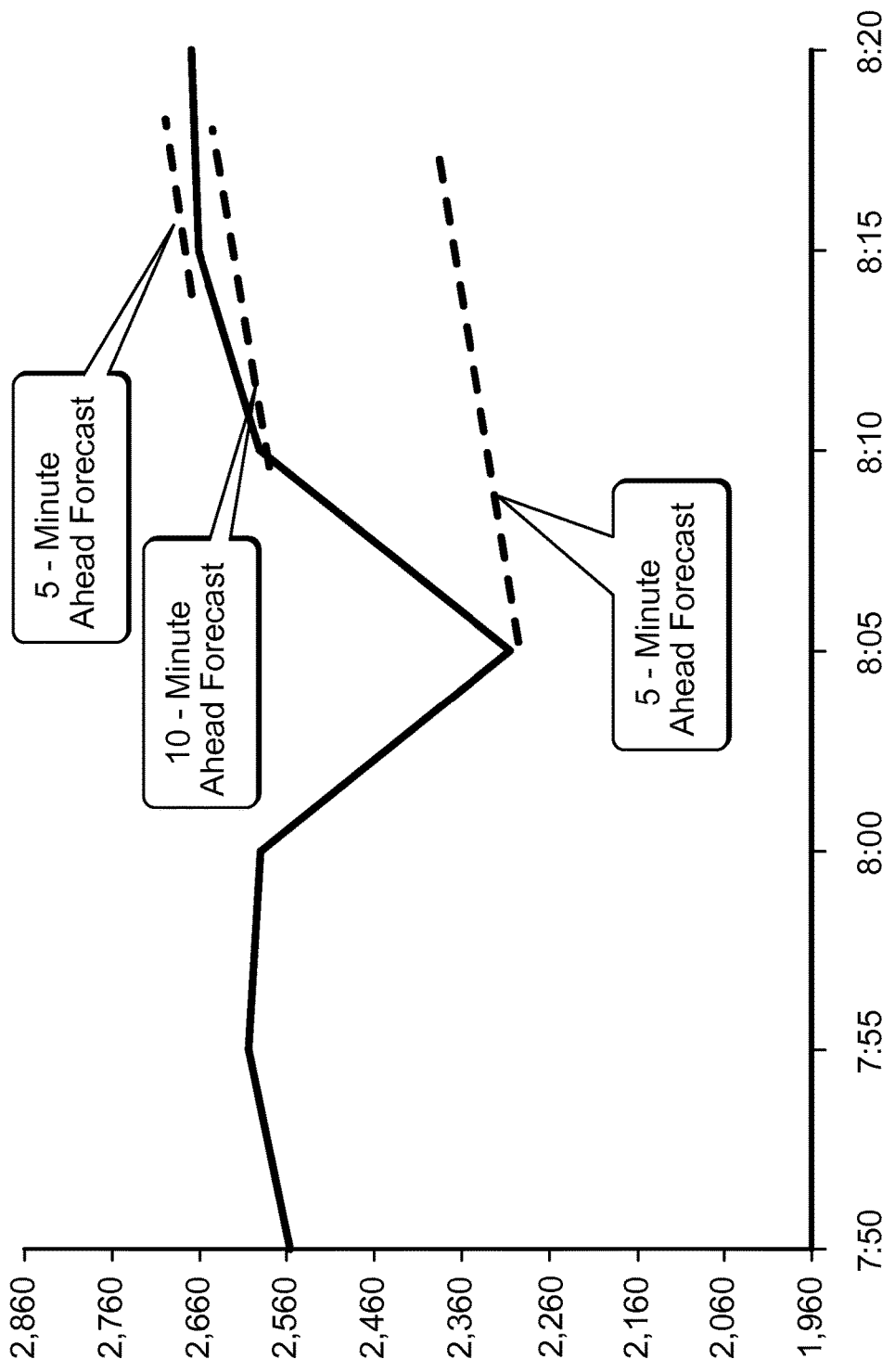
FIG. 3 is a graph illustrating an example of forecasting using noisy data.

FIG. 3 shows an example that includes a sequence of three load forecasts for an arbitrary time (8:20 a.m.) that were generated using the SCADA data. The first is a 15-minute-ahead forecast generated using SCADA data through 8:05 a.m. The second is a 10-minute-ahead forecast that was generated using SCADA data through 8:10 a.m. The third is the five-minute-ahead forecast that was generated using SCADA data through 8:15 a.m.

In this example, an autoregressive model that launches off the 8:05 a.m. data leads to a 15-minute-ahead load forecast that ultimately will fall well below the actual 8:20 a.m. load. The same autoregressive model that launches off the 8:10 a.m. data point is higher, reflecting the increase in loads between 8:05 a.m. and 8:10 a.m. The relatively smooth transition in actual loads from 8:10 a.m. to 8:15 a.m. leads to a relatively consistent or stable 10-minute-ahead and five-minute-ahead forecast for loads at 8:20 a.m. Because of the large variation in the forecasts for 8:20 a.m., many system operators will conclude that the near-term forecasts are unreliable and hence will hold in reserve additional spinning generation capacity to cover perceived load variability and/or uncertainty.

Figure 4:
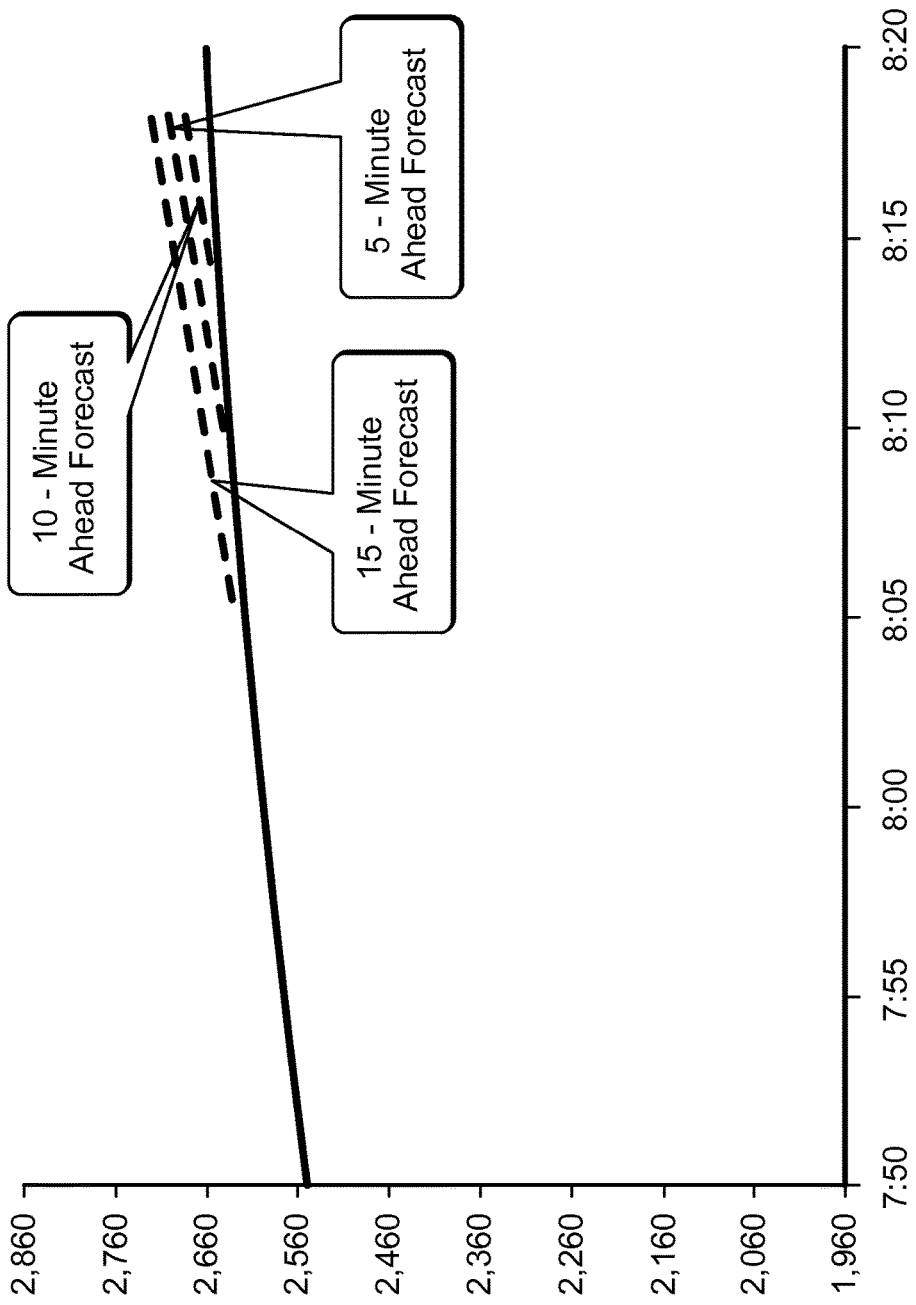
FIG. 4 is a graph illustrating an example of forecasting using smooth data.

FIG. 4 shows a contrasting example, wherein the sequence of 8:20 a.m. forecasts results from an autoregressive model launching off the smoothed data series. In this example, the three 15-minute-ahead forecasts are approximately the same, which gives them credibility with system operators. Accordingly, operators can feel comfortable working within a more cost effective level of spinning reserves than they would under the example presented in FIG. 3.

This example illustrates the need for a means of smoothing SCADA reads. Ideally, the technique will capture systematic changes in demand (which must be recognized to produce accurate near-term forecasts), while filtering out erroneous and random fluctuations. The goal is to produce a smooth sequence of load forecasts that accurately forecast systematic changes in loads. The example algorithm presented below achieves this goal by breaking the problem down into two tasks. In the first task, the SCADA data are filtered to eliminate data outliers. In the second task, outlier-corrected data are then smoothed to dampen random fluctuations in the data.

A filter, such as a Kalman filter, may be used to filter the incoming SCADA reads. The Kalman Filter is a recursive algorithm that estimates the state of a system in the presence of measurement error. The Kalman Filter is applicable to system load forecasting since the state of the system (e.g., system load) is measured imprecisely using SCADA metering. The Kalman Filter has computational appeal because it only needs the most recent observation to perform the data filtering once the filter has been primed with exogenous data. This is in contrast with time series techniques that iterate over a quantity of historical data to develop an estimate of a current state. However, in other examples, other filters may be used.

The Kalman Filter may utilize two sets of equations, including update equations and measurement equations. In one example, the update equation may take the form of:

$$\hat{L}_t = A_t \hat{L}_{t-1} + e_t \quad \text{(Equation 1)}$$

where:

$\hat{L}_t$ is an a priori estimate of the load in period (t)

$\hat{L}_{t-1}$ is an ex post estimate of the load from the prior period (t−1)

$e_t$ is the process error that measures the variability of loads in period (t)

The update equation provides an a priori estimate of the current system load. This estimate is a linear combination of the ex post system load estimate from the prior period and a measure of process error. Process error can be thought of as the volatility of the load at a given time period. The process error may be different for different periods of the day. For example, there may be large variations in loads during the afternoon hours when customer loads are driven by variations in weather and operating conditions. In contrast, loads during the early morning hours tend to vary less because the impact of weather and operating conditions are mitigated by the fact that most businesses are closed during those hours. The parameter vector ($A_t$), which defines the relationship between prior and current period loads, is allowed to vary through the day. This is needed since during the ramp up in loads in the morning hours the relationship will be positive and greater than 1.0, while the ramp down in the late evening hours will call for a value less than 1.0.

In one example, the measurement equation may take the form of:

$$L_t^O = B_t L_t + u_t \quad \text{(Equation 2)}$$

where:

$L_t$ is the true system load at time (t) that is not observed directly $L_t^O$ is the observed system load at time (t)

$u_t$ is the measurement error at time (t)

The measurement equation states that the measured load is equal to the true load plus a random measurement error.

This is the case with SCADA reads where dropped pulses and other reading errors give imprecise measurements of the true state of the system.

The update and measurement equations provide two independently generated estimates of the true load at time (t). The Kalman filter suggests a means for constructing a weighted average of these two estimates to derive a final estimate of the system load at time (t). The weighting scheme can be written as follows:

$$\hat{L}_t = \hat{L}_t^- + K_t(L_t^O - \hat{L}_t^-)$$ (Equation 3)

The Kalman filter equation states that our best predictor of the current system load is a weighted average of our a priori estimate from the update equation and the innovation or residual between our a priori estimate and the observed load. The weight is referred to as the Kalman gain (K). Kalman derived the optimal means of computing the Kalman gain as follows:

$$K_t = \frac{\sigma_{e,t}^2}{\sigma_{e,t}^2 + \sigma_{u,t}^2}.$$ (Equation 4)

Here, the Kalman gain is a function of the variance of the process noise from the update equation ($\sigma_{e,t}^2$) and the variance of the measurement error ($\sigma_{u,t}^2$) from the measurement equation. The greater the process noise variance relative to the measurement error variance, the greater the weight that is placed on the observed system load. Conversely, the greater the measurement error variance relative to the process noise variance the greater is the weight placed on the a priori estimate. This weighting scheme has intuitive appeal in that the noisier the load, the less weight is placed on the most recent observations. Since the load value that is passed through to the forecast models is a weighted average the Kalman filter smoothes (i.e., averages) noisy measured data.

Figure 5:
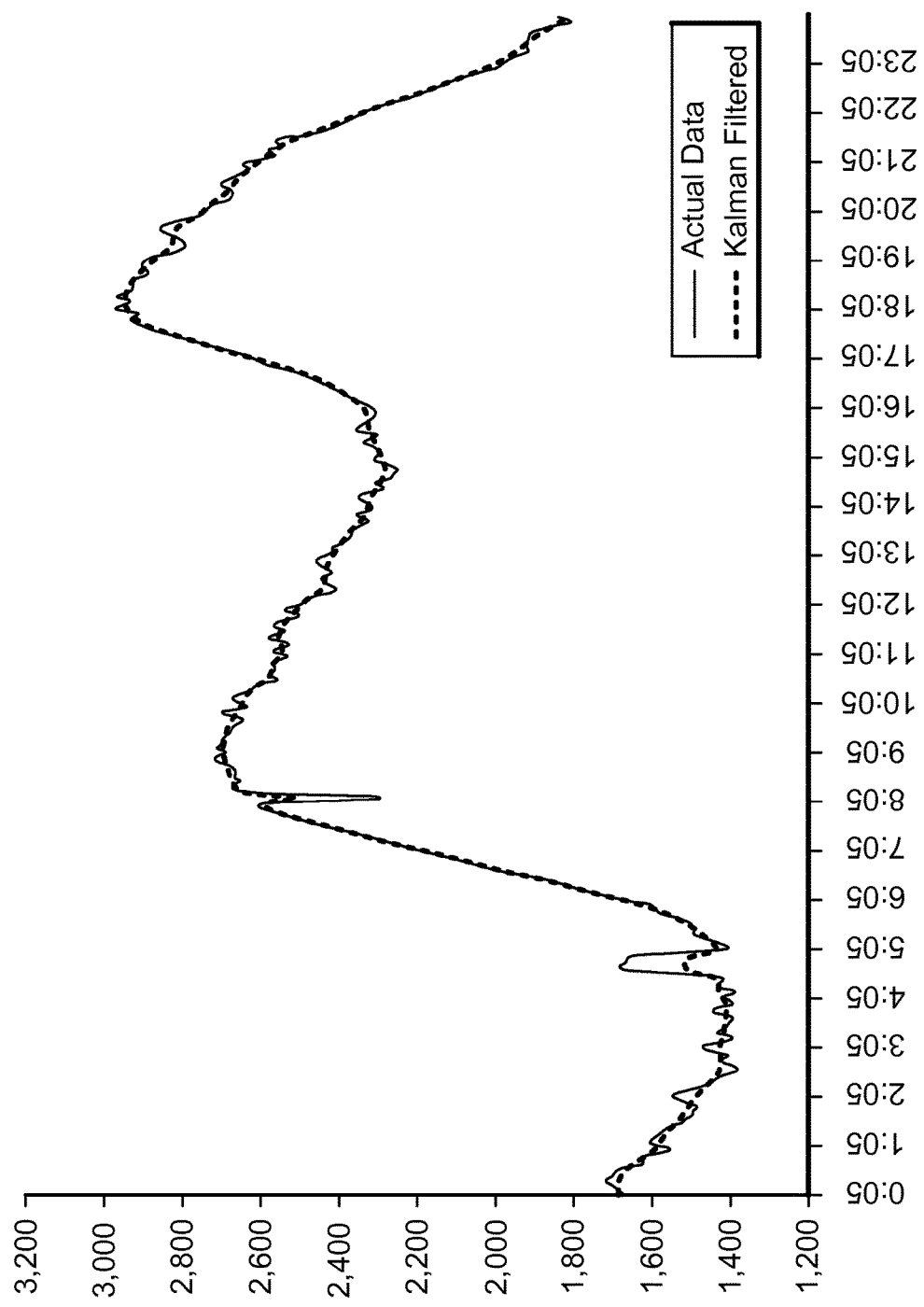
FIG. 5 is a graph illustrating an example application of a Kalman filter to load data.

FIG. 5 shows an example application of a Kalman filter to load data. In the example application of the Kalman Filter, two sets of parameters may be fed into the algorithm as exogenous factors. The first set is the parameter vector (A) of the update equation that relates prior period loads to current loads. In practice, the historical average of the ratio of load at time (t) to the load at time (t−1) can be used to provide an estimate of the vector (A).

The second parameter set to estimate includes the period-specific update equation error variances ($\sigma_{e,t}^2$). These can be computed from the historical data as follows:

$$\sigma_{e,t}^2 = \frac{\sum_{n=1}^{N}(\bar{L}^t - L_n^t)^2}{N}.$$ (Equation 5)

The historical variance of the load at each time period (t) may be used as a proxy of the update equation error variance. $\bar{L}^t$ is the average load in period (t). To compute the measurement error variance for a given observation, the following may be used:

$$\sigma_{u,t}^2 = (\bar{L}^t - L_t^O)^2$$ (Equation 6)

Because the proxy of the update equation error variance requires looping over all the data in the historical data set, these values may be computed externally and passed in as a vector of exogenous data. The measurement error variance may be computed each period given an exogenously supplied vector of expected loads by period.

Two-Stage Modified Kalman Filter

In the example above, the Kalman filter replaces each load value with a weighted average value, regardless of whether the observed data point is an outlier or not. In the example of FIG. 5, the solid line represents actual data, and the dashed line represents Kalman filtered data. FIG. 5 shows that data outliers like the 8:05 a.m. load spike may still pass through to the forecast models, despite damping by the Kalman filter. Thus, even after filtering, data outliers may result in decreased forecast accuracy and increased forecast instability. To avoid introducing erroneous forecasts during critical operating periods of the day, a data filtering algorithm may be configured to pass to the forecast models: (a) observed loads that lie within expected ranges, and (b) statistical model-based predicted loads when observed loads fall outside expected ranges. Replacing an outlier with a model-based prediction ensures the adverse impact of an outlier is eliminated altogether. This allows use of the observed loads when the data are good and model predicted loads when they are outliers.

A modification of the Kalman filter may be used to assist in load forecasting. The modification may include two stages. The first stage may be configured for outlier detection, and may include a ramp rate filter test and a load level filter test. Data outliers may include data having markedly different values from other data associated with similar points in time. The 8:05 a.m. down spike shown in FIG. 2 is an example of such an outlier. The second stage may be configured to replace the outliers with predicted values from a statistical model. An example two-stage filter is disclosed below.

The first stage of the Kalman filter is configured for detection of data that does not fit a prediction, expectation and/or model. FIG. 2 illustrates two important types of data outliers, which challenge near-term forecasting: (1) load shifts, and (2) load spikes. An example of a load shift is the rise in loads that takes place between 4 a.m. and 5 a.m. An example of a load spike is the downward spike in loads that occurs at 8:05 a.m. Load spikes can be detected by a ramp rate filter that compares the observed ramp rate to an expected ramp rate to test whether or not the five minute change in loads is within the bounds of expectation. A ramp rate filter may successfully detect spikes such as the one that occurred at 8:05 a.m., as well as the initial change in loads at the beginning and end of the 4 a.m. load shift. A ramp rate filter, however, will not be able to detect a load shift since the ramp rates from one shifted value to another will be within expected ranges. To trap or recognize a load shift, a load level filter that compares the observed load to an expected load may be used. Such a load level filter may test and determine whether or not the load value is at an acceptable level. An observed load, that satisfies both the ramp rate filter and the load level filter, may be considered to be a valid load. An observed load that fails the ramp rate filter test, the load level filter test, or both tests may be considered to be an outlier that needs replacement. Example ramp rate filter test calculations are presented below.

The ramp rate filter test may compare the observed ramp rate to an expected ramp rate. If the observed ramp rate is significantly different from the expected ramp rate, there may be an indication that the current load value is a spike (either upward or downward). This allows use of the following binary test.

$$RR\_Filter_t = (R_t^O \geq LowerBound_t^R) \times (R_t^O \leq UpperBound_t^R)$$ (Equation 7)

where:

$$R_t^O = \text{Load}_t^O - \text{Load}_{t-1}^O$$

$$\text{LowerBound}_t^R = \hat{R}_t - (RR\_Tolerance \times \hat{\sigma}_t^R)$$

$$\text{UpperBound}_t^R = \hat{R}_t + (RR\_Tolerance \times \hat{\sigma}_t^R)$$

In this example binary test, the ramp rate filter test returns a value of 1.0 if the observed ramp rate in time period (t) is between the expected bounds (inclusive of the boundaries) for the ramp rate. The binary test returns 0.0 otherwise. The boundaries are computed as the expected ramp rate ($\hat{R}_t$) plus or minus a ramp rate tolerance times the standard deviation around the expected ramp rate ($\hat{\sigma}_t^R$). (In one example, the sigma values, such as ($\hat{\sigma}_t^R$), may be obtained by use of a generalized autoregressive conditional heteroskedasticity (GARCH) model, which provides a means to obtain values of the ramp rate variance that includes both autoregressive components and heteroskedastic components. Autoregressive components may include prior period and prior day variances. Heteroskedastic components may include weather and calendar conditions. The value for the expected ramp rate and its standard deviation may be provided exogenously to the test. In some example implementations, these values are derived from historical data using statistical models of the observed ramp rates. The ramp rate variances may then be drawn from the model errors. The value of the ramp rate tolerance may determine the precision of the test. The tighter the bounds, the more likely any given observation will be replaced with an expected value. If the expected values represent smooth values from a model, the ramp rate tolerance may be considered a smoothing parameter.

Figure 6:
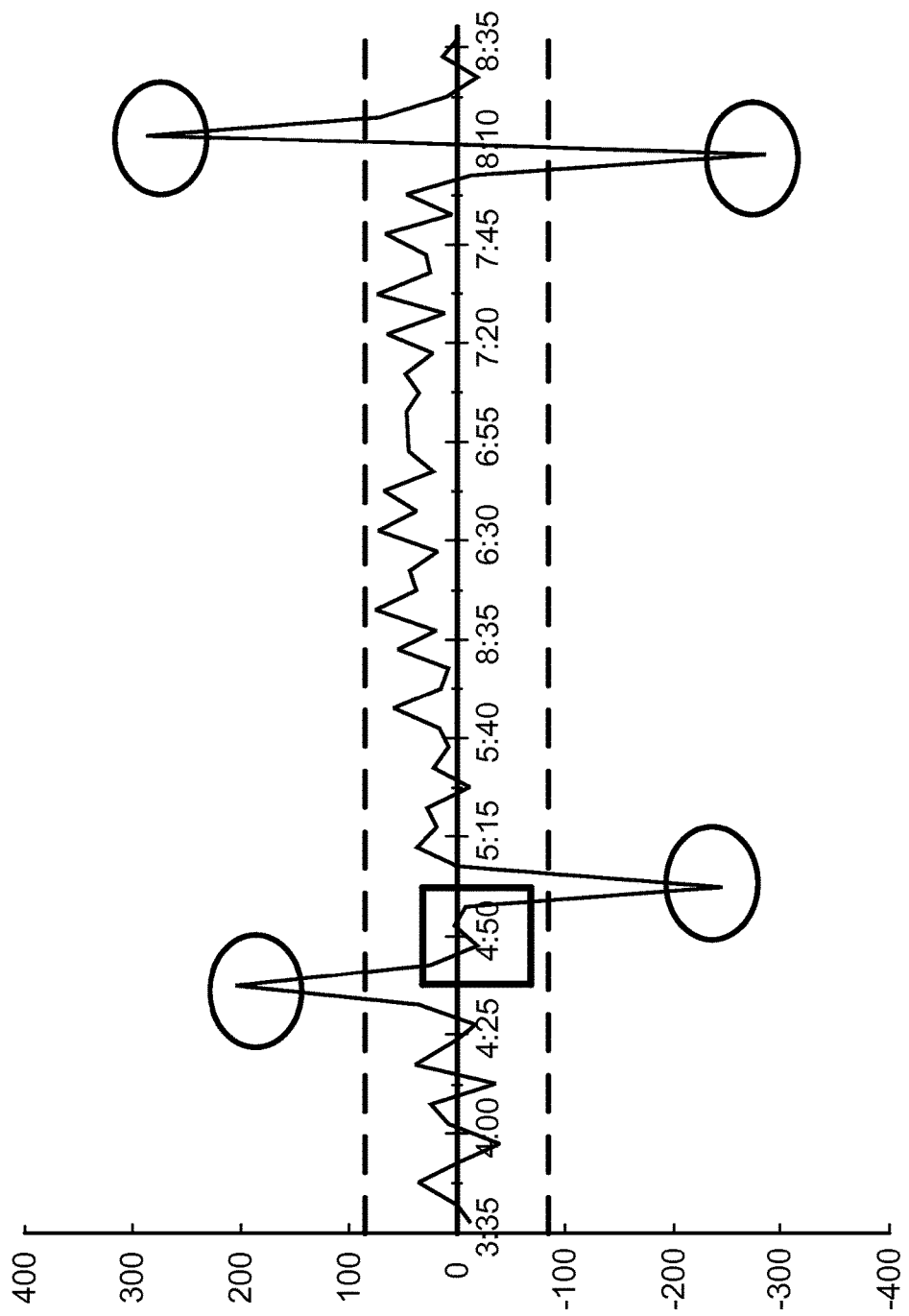
FIG. 6 is a graph illustrating an example of a ramp rate filter test.

FIG. 6 shows an example application of the ramp rate filter test. The data from FIG. 2 have been converted to ramp rate space and plotted in FIG. 5. In this example illustration of the test, the data have been restricted to the time period of 3:30 a.m. through 8:30 a.m. The observed ramp rates are represented by the solid line. The upper and lower bounds of the ramp rate filter test are given by the dashed lines. The circled ramp rates fall outside the bounds and are treated as outliers. In this example, the ramp rate filter traps the ramp rates at the beginning and end of the early morning load shift, and the beginning and end of the 8:05 a.m. downward load spike. The ramp rates highlighted by the box come from the period within the early morning load shift and are all within tolerances, and hence are not trapped by the ramp rate filter test.

The load level filter test compares the observed load to an expected load and may be configured to capture load shifts. If the observed load is significantly different from the expected load there is an indication of a load shift. This allows use of the following binary test:

$$\text{Load\_Filter}_t = (\text{Load}_t^O \geq \text{LowerBound}_t^L) \times (\text{Load}_t^O \leq \text{UpperBound}_t^L), \quad \text{(Equation 8)}$$

where:

$$\text{LowerBound}_t^L = \hat{L}_t - (\text{Load\_Tolerance} \times \hat{\sigma}_t^L); \quad \text{(Equation 9)}$$

and $$\text{UpperBound}_t^L = \hat{L}_t + (\text{Load\_Tolerance} \times \hat{\sigma}_t^L). \quad \text{(Equation 10)}$$

In the above example, the load level filter test returns a value of 1.0 if the observed load in time period (t) is between the expected bounds for the load, and returns 0.0 otherwise. The bounds are computed as the expected Load ($\hat{L}_t$) plus or minus the load tolerance times the standard deviation around the expected load ($\hat{\sigma}_t^L$). Like the ramp rate tolerance, the load tolerance can be considered a smoothing parameter. The tighter the tolerance, the more likely the observed data are replaced with an estimated value from a model.

Figure 7:
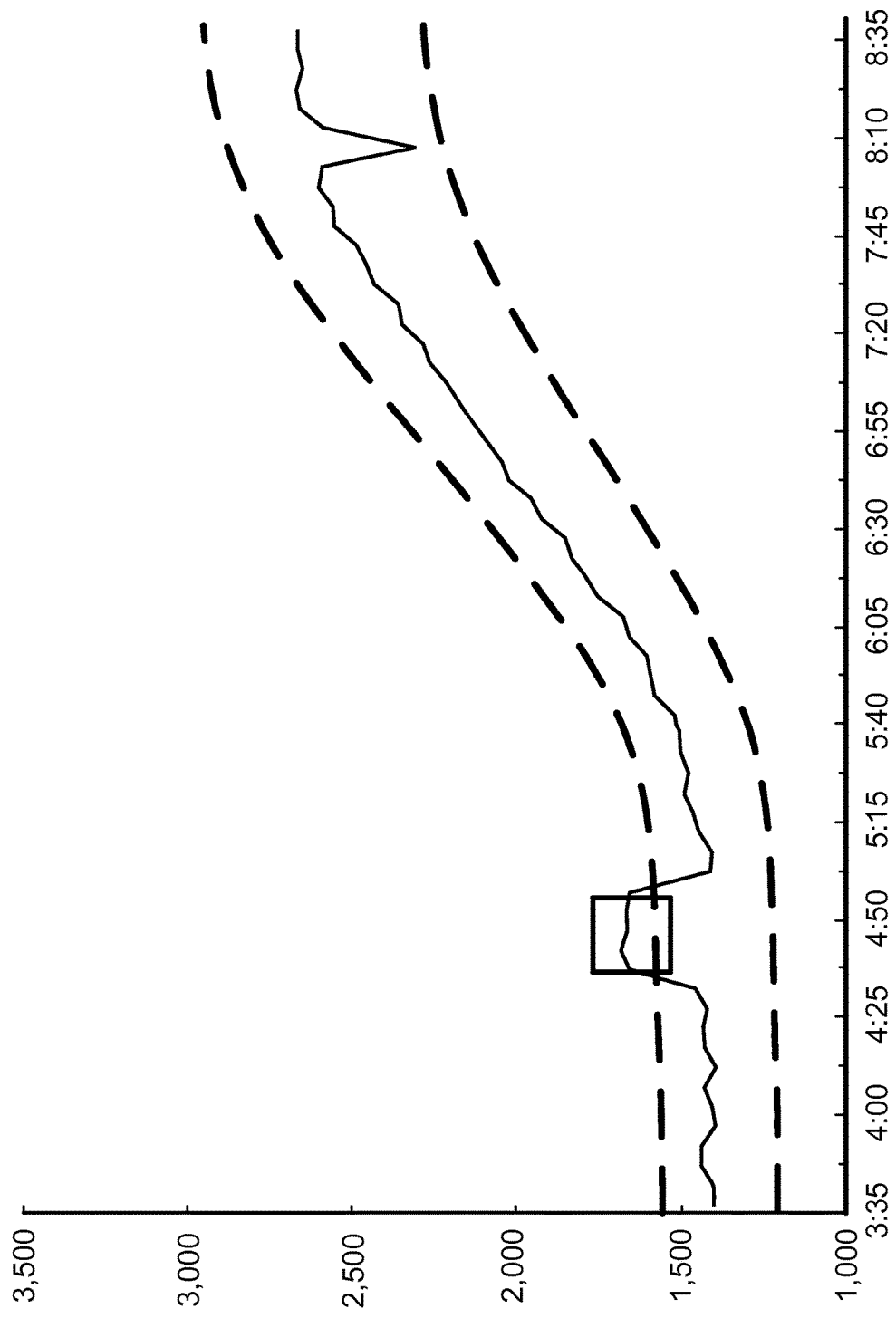
FIG. 7 is a graph illustrating an example of a load level filter test.

FIG. 7 shows an example of data anomalies captured by the load level filter test. In the example, the test data have been restricted to the time period of 3:30 a.m. through 8:30 a.m. The observed loads are represented by the solid line. The upper and lower bounds of the load level filter test are given by the dashed lines. The loads highlighted by the box fall outside the bounds and are treated as outliers. In this example, these are the data points not trapped by the ramp rate filter test.

In the example, the results of the stage one ramp rate and load level filter tests indicate a modified Kalman filter that can be described as follows:

$$\text{KalmanFilter}_t = RR\_Filter_t \times Load\_Filter_t \quad \text{(Equation 11)}$$

In such an example, the Kalman update equations may be written as:

$$\tilde{R}_t = \hat{R}_t + [\text{KalmanFilter}_t \times (R_t^O - \hat{R}_t)] \quad \text{(Equation 12)}$$

$$\tilde{L}_t = L_{t-1}^F + \tilde{R}_t \quad \text{(Equation 13)}$$

$$\hat{L}_t^F = \tilde{L}_t + [\text{KalmanFilter}_t \times (L_t^O - \tilde{L}_t)], \quad \text{(Equation 14)}$$

where:

$\tilde{R}_t$ is the filtered estimate of the ramp rate for time period (t);

$\tilde{L}_t$ is the ex ante estimate of the load value for period (t); and $\hat{L}_t^F$ is the Kalman Filtered load for period (t).

In the case where the current load value satisfies both the ramp rate and load level filter tests, then $\hat{L}_t^F$ will be equal to the observed load. In the case where either the ramp rate test, the load level test, or both tests fail, the observed load value is replaced with the ex ante estimate, or $\tilde{L}_t$.

Figure 8:
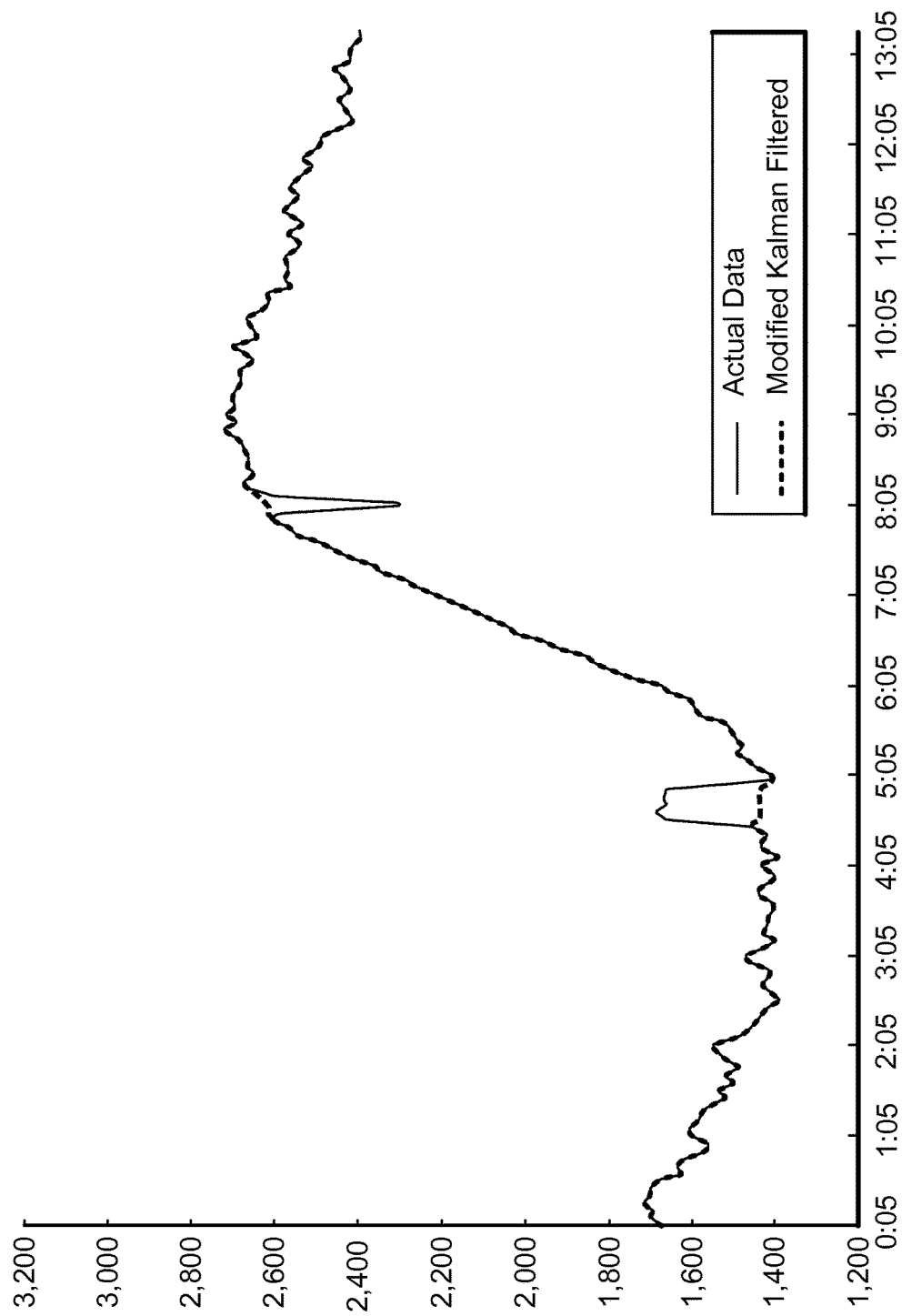
FIG. 8 is a graph illustrating an example application of a two-stage modified Kalman filter.

FIG. 8 shows an example of the application of the two-stage modified Kalman filter. Here the filtered data is given by the dashed line. The actual data, including the data outliers that have been removed by operation of the filter, are represented by the solid line.

In the example implementation, the two-stage modified Kalman filter may utilize two sets of models: ramp rate model(s) and load level model(s). In one example, each model may be composed of 288 equations—one equation for each of the five-minute intervals in the day. The ramp rate model may relate ramp rates to prevailing calendar, weather, and solar conditions. The general form of the ramp rate model may be written as follows:

$$\text{RampRate}_t^d = f(\text{Calendar}_t^d, \text{Weather}_t^d, \text{Solar}_t^d) + e_t, \quad \text{(Equation 15)}$$

where:

$\text{RampRate}_t^d$ is the Ramp rate at time (t) and day (d);

$\text{Calendar}_t^d$ is a set of Day-of-the-Week, Holiday and Season variables;

$\text{Weather}_t^d$ is a set of Heating Degree Day and Cooling Degree Day spline variables;

$\text{Solar}_t^d$ is a set of variables driven by sunrise and sunset times and observance of Day Light Savings; and $e_t$ is the model residual at time (t).

The squared residuals from the ramp rate are modeled to form estimates of the ramp rate ($\hat{\sigma}_t^R$) standard errors. In one example of operation, the model of the ramp rate variances may allow the variance to vary by workday and non-workday and by hot day and cold day. The ramp rate variance model may be written as follows:

$$e_t^2 = f(\text{Calendar}_t^d, \text{Weather}_t^d, \text{Solar}_t^d) + u_t. \quad \text{(Equation 16)}$$

In this example, the residuals from the ramp rate model are squared and then fitted to a statistical model. The predicted values from this model are then used to form the ramp rate tolerance values. In practice, the ramp rate variance model specification may be simpler in form than the original ramp rate model.

The load level model relates loads to prior same time period loads, as well as prevailing calendar, weather and solar conditions. The general form of the load level model may be written as follows:

$$\text{Load}_t^d = f(\text{Load}_{t-1}, \ldots \text{Load}_{t-p}, \text{Calendar}_t^d, \text{Weather}_t^d, \text{Solar}_t^d) + \varepsilon_t, \quad \text{(Equation 17)}$$

where:
$\text{Load}_t^d$ is the Load at time (t) and day (d);
$\text{Load}_{t-p}$ is the Load at time (t−p);
$\text{Calendar}_t^d$ is a set of Day-of-the-Week, Holiday and Season variables;
$\text{Weather}_t^d$ is a set of Heating Degree Day and Cooling Degree Day spline variables;
$\text{Solar}_t^d$ is a set of variables driven by sunrise and sunset times and observance of Day Light Savings; and
$\varepsilon_t$ is the model residual at time (t).

The squared residuals from the load level model are modeled to form estimates of the load level $(\hat{\sigma}_t^L)$ standard errors. In example operation, this model may be similar in form to the ramp rate variances model, in that it may allow the load level variance to vary by workday and non-workday and by hot day and cold day. The load level variance model can be written generally as follows:

$$\varepsilon_t^2 = f(\text{Calendar}_t^d, \text{Weather}_t^d, \text{Solar}_t^d) + \delta_t \quad \text{(Equation 18)}$$

Finally, the values for the ramp rate and load level tolerances may depend on the quality of the underlying SCADA measurements. This in turn may dictate how tight the filter tests need to be. In some examples, only the most egregious load shifts and data spikes need to be captured. For many large systems, tolerances greater than 2.0can be used for the ramp rate and load level filter tests. Because there is no theoretical foundation for the optimal tolerance value, reasonable experimentation (e.g., trial and error) may be needed to set the tolerances at serviceable levels.

Augmented Savitzky-Golay Filter

The two-stage modified Kalman filter is designed to eliminate outliers in the incoming data series. The knife edge nature of the filter will pass through non-outlier data values as originally metered. As can be seen in FIG. 8, this means the filtered data can still contain noise in the form of random fluctuations that fall within the upper and lower bounds of the ramp rate and load level filter tests. To improve forecast stability, the random fluctuations may be dampened or smoothed. A Savitzky-Golay smoothing filter may be used as a tool to damp random fluctuations. The Savitzky-Golay filter may be configured as a moving average filter, using weights that are derived by fitting a local polynomial to the data. Depending on the order of the polynomial, the Savitzky-Golay filter can be configured to avoid the flattening of the smooth data series that is characteristic of a centered moving average where each observation is given the same weight. In one example, a third order polynomial may preserve a curvature of a typical load shape. An example of a 5-point centered moving Savitzky-Golay filter (SG) can be written as follows:

$$L_t^{SG} = \frac{W^2 L_{t-2} + W^1 L_{t-1} + W^0 L_t + W^1 L_{t+1} + W^2 L_{t+2}}{W^2 + W^1 + W^0 + W^1 + W^2} \quad \text{(Equation 19)}$$

where, $(L_t^{SG})$ is the Savitzky-Golay filtered load and $W^0$, $W^1$, and $W^2$ are the Savitzky-Golay smoothing weights.

Figure 9:
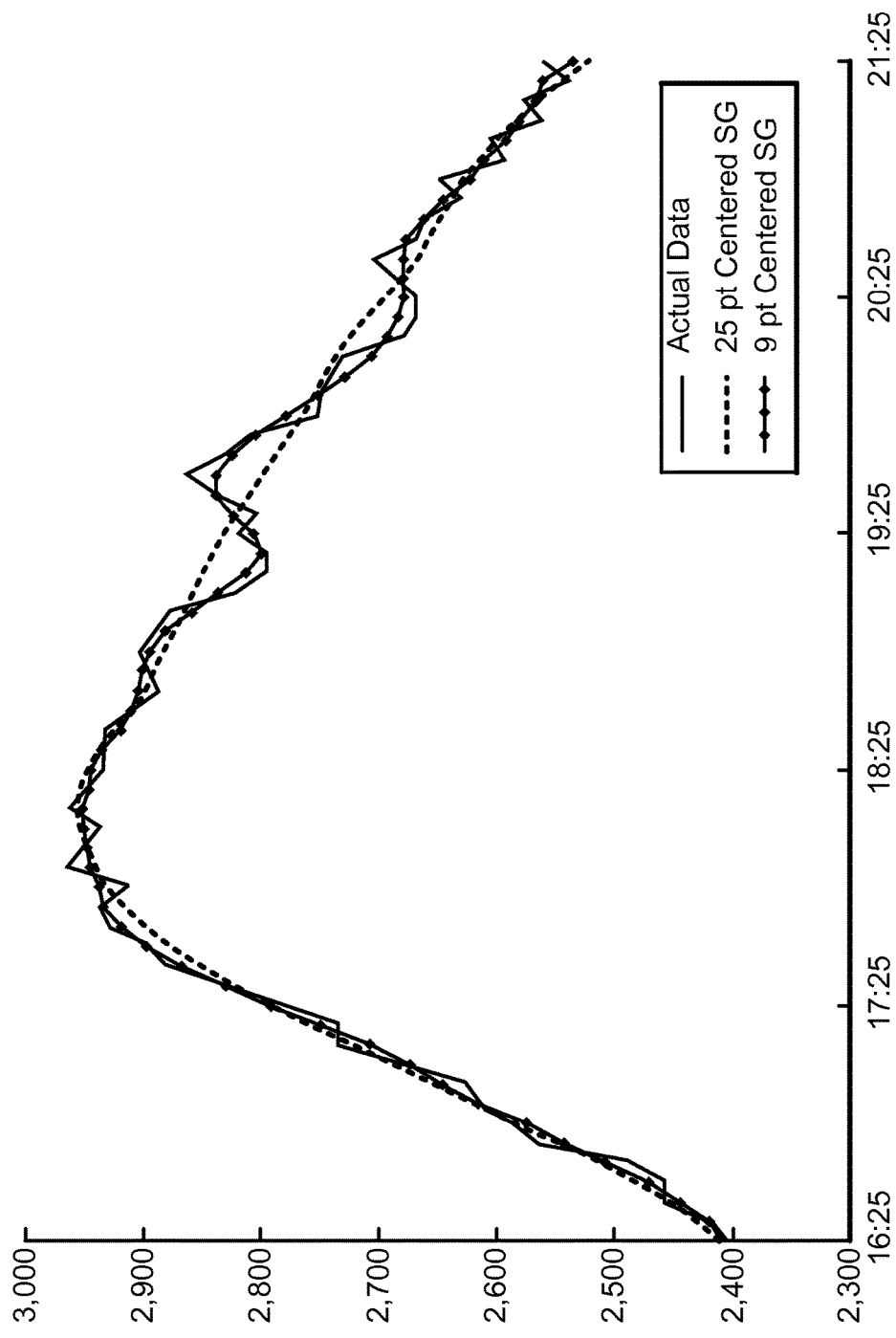
FIG. 9 is a graph illustrating an example of an application of a Savitzky-Golay smoothing filter.

FIG. 9 shows an example resulting from applying a 25-point and a 9-point Savitzky-Glory filter to the data used in FIG. 2. As is the case with a simple moving average, the wider the window over which the moving average calculations are made the smoother the resulting time series. In FIG. 9, the actual load data are represented by the solid line, the 9-point centered moving Savitzky-Golay filtered data are represented by the dotted line, and the 25-point center moving Savitzky-Golay filtered data are represented by the dashed blue line. In practice, 5-, 7-, 9-, 13-, 17-, and 25-point moving average windows are frequently sufficient to smooth through SCADA data for large system loads. The data in the figure illustrate that the narrower the window the more closely the filtered data tracks the actual load data. Conversely, a wider window leads to a smoother time series.

In practice, during ramping periods where random load fluctuations are dominated by large underlying load increases or decreases, a narrower window is preferred to ensure the near-term forecast models are launching off data as close to observed loads as possible. Accordingly, a size of the moving averages window may be a function of expected load changes during times associated with the window. For example, during the period from 16:00 through 18:00 a narrow window would be used. This example includes an implicit assumption that the observed loads are relatively accurate measures of actual system demand, and hence should be relied on heavily to improve forecast accuracy. Essentially, any random measurement error is swamped by the load change experienced during ramping periods of the day. In engineering terms, the signal-to-noise ratios may be large during the ramping periods. During other periods of the day the signal-to-noise ratios may be smaller, in part because the average ramp rate is close to zero. To improve forecast stability during these periods a wider smoothing window is needed to cut through the noise.

While the Savitzky-Golay filter performs well in smoothing historical data when both lags and lead load values are available, a modification to the Savitzky-Golay smoothing filter may be utilized to smooth the most recently available SCADA value. As an example, it may be assumed that a load forecast may be generated for 8:20 a.m. given actual loads through 8:05 a.m. Since the load values for 8:10 a.m. and 8:15 a.m. are not available, the Savitky-Golay smoothing is constrained. In one example, such a constrained equation may take the form:

$$L_{8:05}^{RHSSG} = \frac{W^2 L_{7:55} + W^1 L_{8:00} + W^0 L_{8:05}}{W^2 + W^1 + W^0} \quad \text{(Equation 20)}$$

Since 8:05 a.m. is typically a period when loads are ramping up, the resulting smoothed load value for 8:05 a.m. will be biased downward because the higher load values of 8:10 a.m. and 8:15 a.m. are not available to pull upwards the resulting smoothed value. An analogous upward bias occurs during the evening ramp down period.

Figure 10:
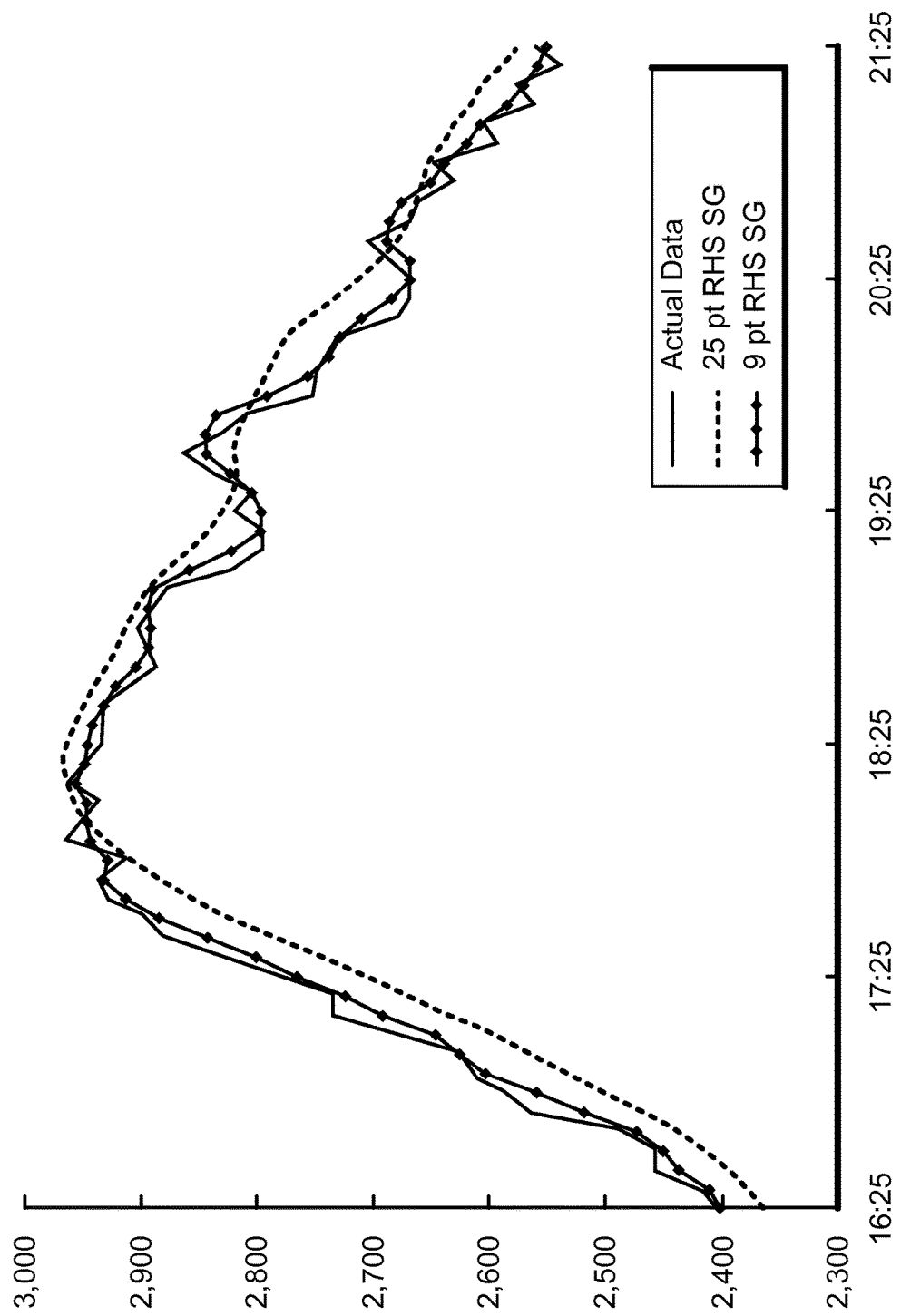
FIG. 10 is a graph illustrating an example of smoothing bias introduced by a right hand side constrained Savitzky-Golay smoothing filter.

FIG. 10 shows an example result of the right hand side constrained smoothing In this example, the actual loads are given by the solid line, the right hand side constrained 9-point Savitzky-Golay filtered series is given by the dotted line, and the right hand side constrained 25-point Savitzky-Golay filtered series is given by the dashed line. In this example, both filtered series run consistently low during the ramp up period from 16:00 through 18:00, and run consistently high during the ramp down period from 18:30 through 21:30. To correct for this bias the Savitzky-Golay smoothing filter may be augmented by a lift factor or multiplier as follows:

$$L_t^{Lift\ SG} = L_t^{RHS\ SG} \times Lift_t \qquad \text{(Equation 21)}$$

where:

($L_t^{Lift\ SG}$) is the smoothed load value from the augmented Savitzky-Golay smoothing filter;

($L_t^{RHS\ SG}$) is the smoothed value from the right hand side constrained Savitzky-Golay smoothing filter; and ($Lift_t$) is the value of the lift multiplier for time period (t).

The general form for computing the lift multipliers may be described by:

$$Lift_t = \left[ \sum_{d=1}^{D} \left( \frac{\dfrac{w^0 L_t^d + \sum_{j=1}^{J}(w^j L_{t-j}^d + w^j L_{t+j}^d)}{w^0 + \sum_{j=1}^{J}(w^j + w^j)}}{\dfrac{w^0 L_t^d + \sum_{j=1}^{J} w^j L_{t-j}^d}{w^0 + \sum_{j=1}^{J} w^j}} \right) \right] / D. \qquad \text{(Equation 22)}$$

For a given day (d) in the historical period the lift multiplier is calculated as the ratio of two Savitzky-Golay moving averages, such as the smoothed load from a centered Savitzky-Golay moving average to the right hand side constrained Savitzky-Golay moving average. The lift value (factor and/or multiplier) for any give time period is then taken as the average of the lift multiplier across one or more days. As a first example, during the morning ramp up periods the lift values will be greater than 1.0 to correct for the downward bias of the right hand side constrained smoothing. As a second example, during the evening ramp down period the lift values will be less than 1.0 to correct for the upward bias of the right hand side constrained smoothing. In a more general example, the lift multiplier may be based in part on a ratio of two moving averages from two smoothing filters, respectively.

Figure 11:
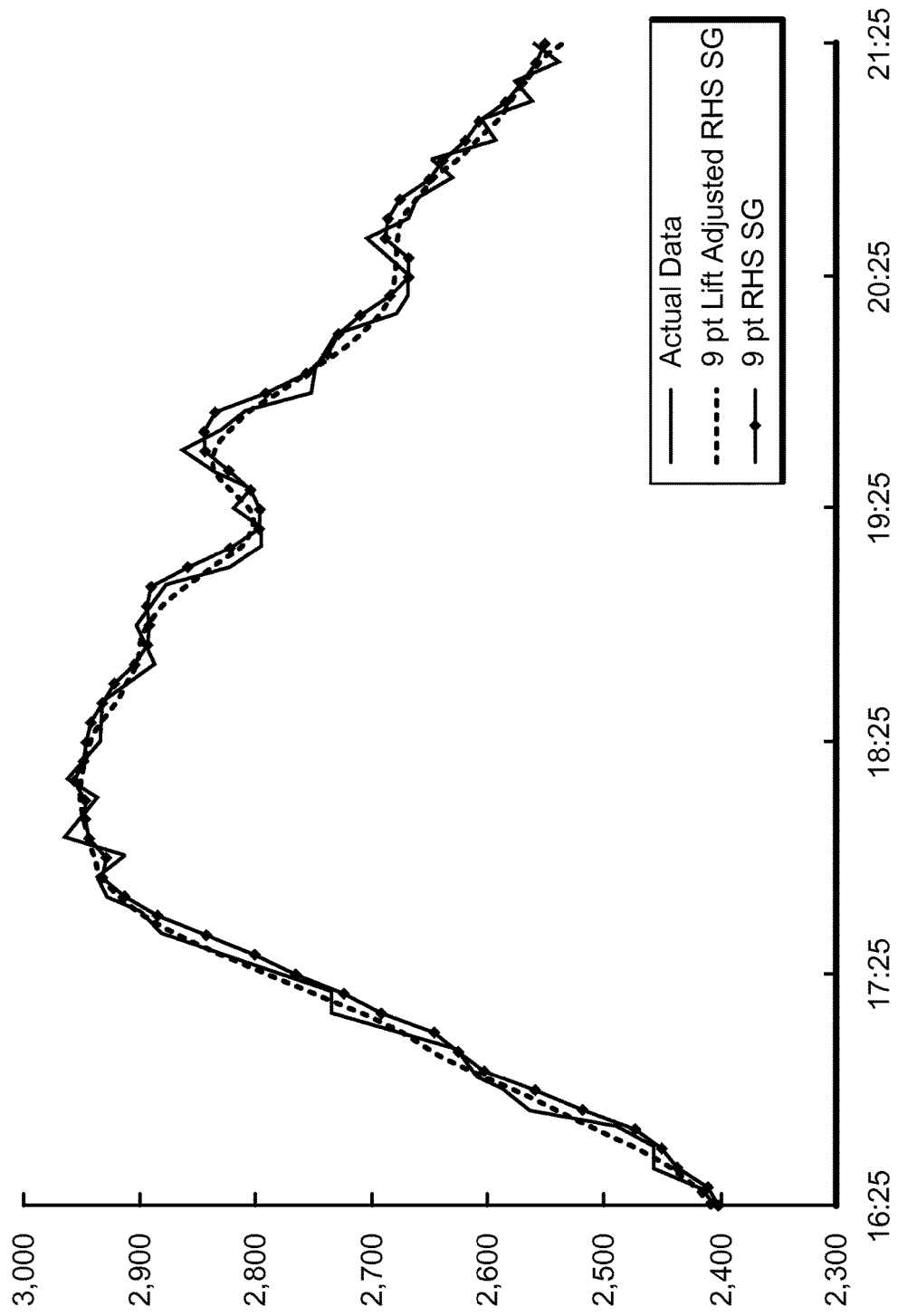
FIG. 11 is a graph illustrating an example of lift-corrected smoothing in a Savitzky-Golay filter.

FIG. 11 shows an example of correction using the 9-point right hand side constrained Savitzky-Golay filter. The solid line is actual data, the dotted line is the original right hand side constrained (RHS) Savitzky-Golay filtered series and the dashed line is the lifted adjusted series.

Figure 12:
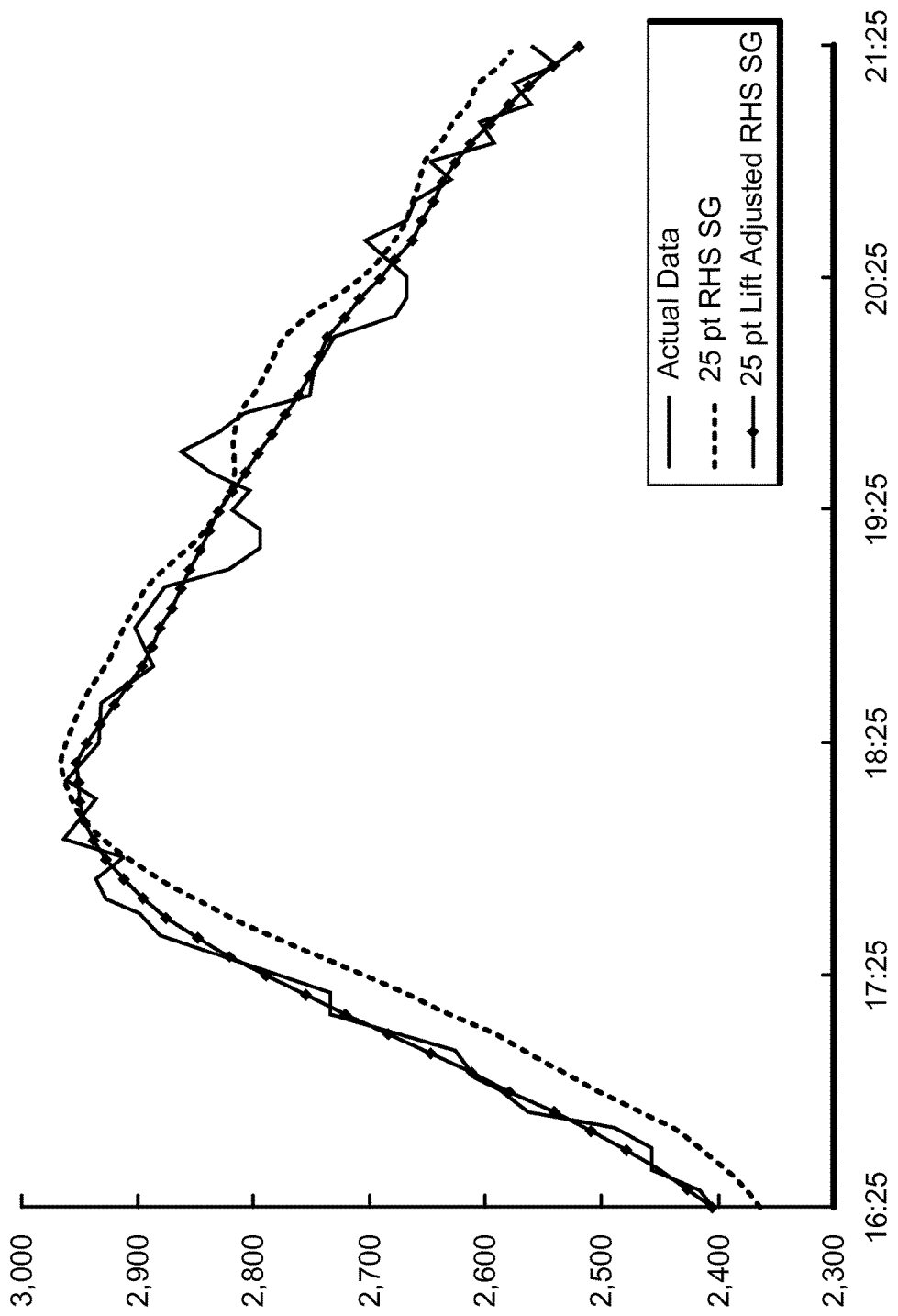
FIG. 12 is a graph illustrating a further example of lift-corrected smoothing in a Savitzky-Golay filter.

FIG. 12 shows a lift correction that is more apparent which displays the data for the 25-point SG filter. In this example, the solid line is the actual data, the dashed line is the RHS Savitzky-Golay filtered series and the dotted line is the lift adjusted series.

In practice, a different set of lift factors or multipliers are computed for each day of the week. The calculations are made using a rolling window of the prior two to seven weeks of historical data. For example, the lift factors for Monday may be computed as the average values for the prior four Mondays. In one example, lift factors may be computed by removing high and low lift values prior to taking an average. This ensures that data anomalies do not enter into the calculation of the lift factors.

Figure 13:
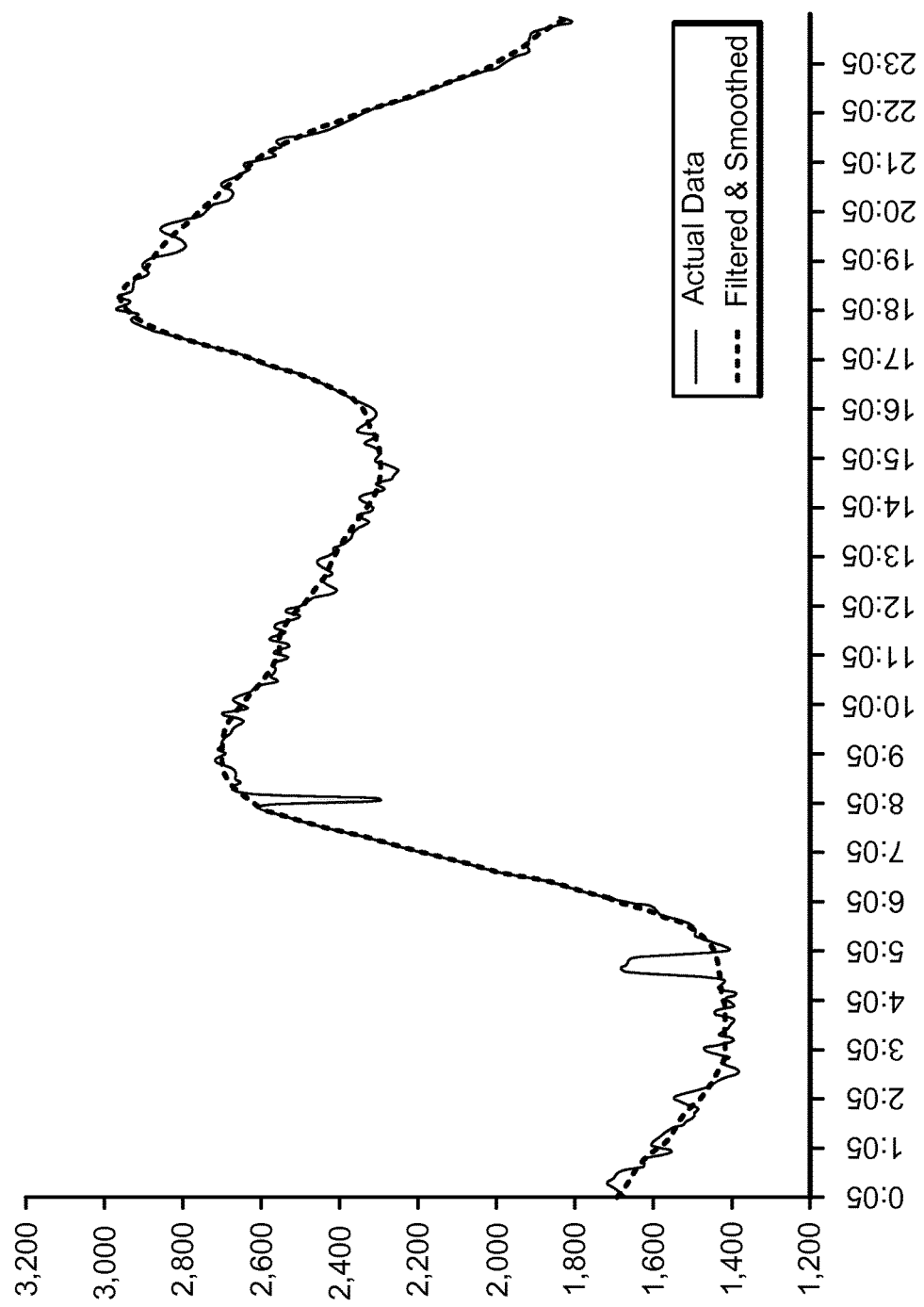
FIG. 13 is a graph illustrating an example of combining data filtering with data smoothing.

FIG. 13 shows an example of applying first the two-stage modified Kalman filter and then the augmented Savitzky-Golay filter. The original metered loads are represented by the solid line. The final filtered and smoothed data series that is passed into the near-term forecasting models is represented by the dashed line. The filtered and smoothed data will improve the overall stability of the near-term forecasts while allowing the forecast models to capture the systematic changes in loads, thus improving the overall accuracy of the forecast.

Example Unified Framework

System load forecasting may leverage information about where the system has been (e.g., as measured by the most recent SCADA reads) and where the system is going (e.g., as projected by forecasted calendar, solar, and weather conditions). Knowing past demand levels within the system may be very useful for forecasting loads five minutes in the future. For example, if it is 8:00 a.m. and the focus is forecasted loads at 8:05 a.m., then knowing actual loads through 8:00 a.m. is a very powerful forecast driver. In contrast, if the focus is the load at 8:05 a.m. seven days from now, then knowing what loads are at 8:00 a.m. today is not as useful as knowing that seven days from now it will be a hot summer day. At some point in the forecast horizon, the explanatory power of the most recent loads becomes less important than predicted and/or known future calendar, solar, and weather conditions. The example unified near-term and short-term forecasting framework is designed in part to exploit this concept.

The framework balances past demand levels with predicted and known factors by using a combination of three different forecast models. For very near-term forecast horizons, the unified forecast is derived from a set of highly autoregressive near-term forecast models that drive off the most recent SCADA data. For longer forecast horizons, the unified forecast is derived from a set of non-autoregressive short-term models that are driven by calendar, solar, and weather conditions. A model of five-minute ramp rate forecasts is then introduced to bridge a gap between the two alternative forecasts.

Near-term model specifications tend to be relatively sparse because the majority of the predictive power of the model is contained in the autoregressive terms which capture the current state of the system loads. In one example, a near-term forecast model is composed of 288 regression equations, one equation for each five-minute interval of the day. The general form of these regressions can be written as follows:

$$Load_t^d = F(Autoregressive_t^d, Calendar_t^d, Weather_t^d, Solar_t^d) + e_t^d \qquad \text{(Equation 23)}$$

where, $Load_t^d$ is the five-minute load at time interval (t) on day (d);

$Autoregressive_t^d$ is the set of autoregressive terms for loads at time interval (t) and day (d).

$Calendar^d$ is a set of binary variables that indicate the day-of-the-week, season, and observance of public holidays;

$Weather_t^d$ is a set of heating degree day and cooling degree day temperature variables that capture current and lagged weather conditions;

$Solar_t^d$ is a set of solar variables that indicate the time of the sunrise and sunset and adjustments for observance of Day Light Savings Time.

$Weather_t^d$ is a set of heating degree day and cooling degree day temperature variables that capture current and lagged weather conditions; and Solar$_t^d$ is a set of solar variables that indicate the time of the sunrise and sunset and adjustments for observance of Day Light Savings Time.

Figure 14:
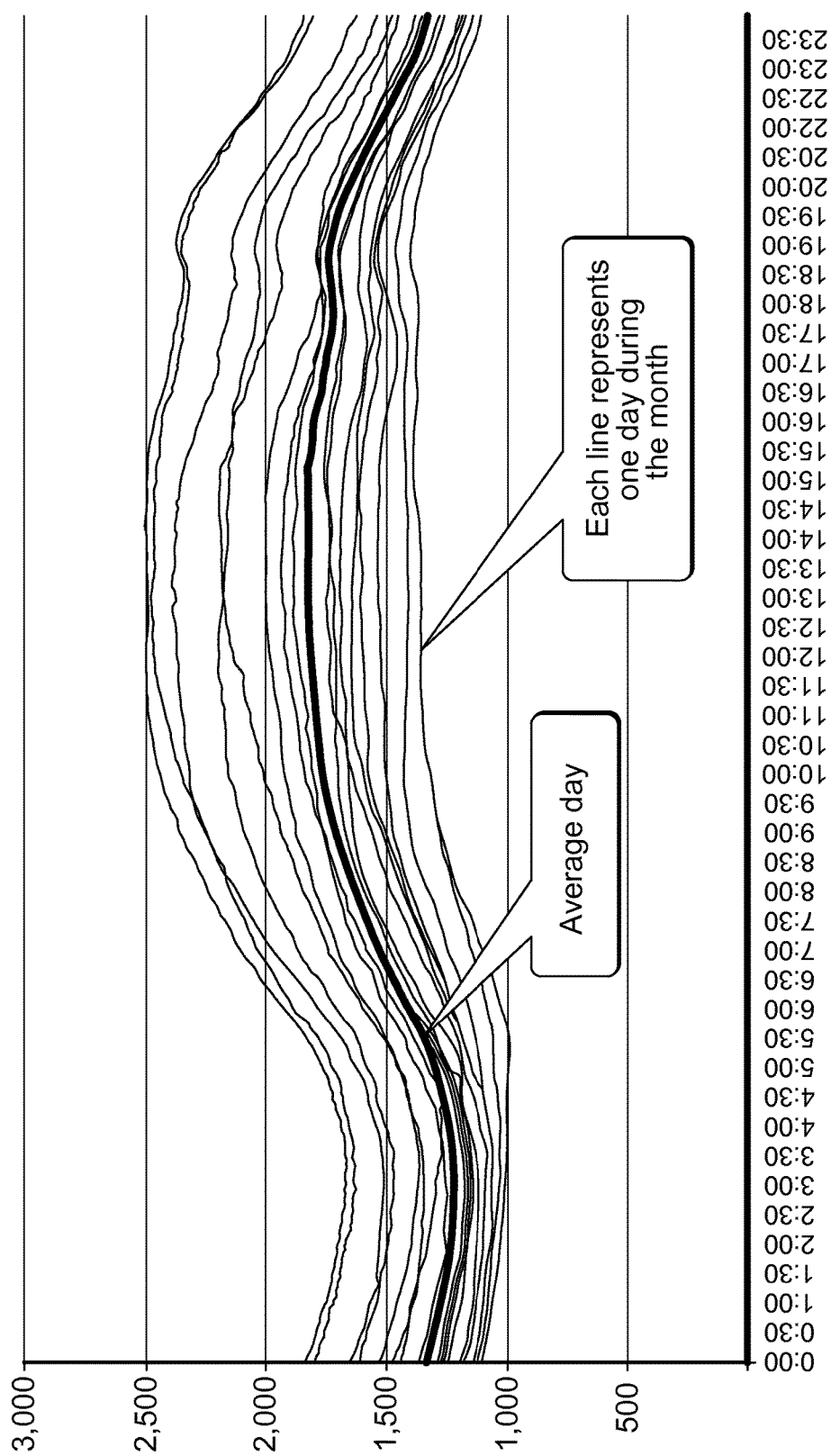
FIG. 14 is a graph illustrating five-minute daily load shapes for an example utility system.

In one example, a design goal for a short-term forecast model is to accurately forecast load variations over a wide range of calendar, solar, and weather conditions. In addition, it is important that the short-term forecast be very responsive to projected weather fronts rolling through the operating region. To achieve these goals, the short-term forecast model specification may be free from autoregressive terms that will impede the responsiveness of the forecast to changes in weather. With lessened reliance on autoregressive terms, the short-term model specification may include a rich treatment of calendar, weather and solar conditions in order to achieve a high level of forecast accuracy. In practice, the short-term model is developed at the 15-minute level of load resolution and may be composed of a set of 97 equations: 96 regression equations (one for each 15-minute interval of the day), and one neural network model of daily energy. The forecast from the daily energy model is used to drive the forecasts from the set of 15-minute interval models. The short-term model specification can be written generally as follows:

$$DailyEnergy^d = \qquad \text{(Equation 24)}$$
$$N(Calendar^d, Weather^d, Solar^d, Economics^d) + u^d$$

$$Load\_15Minute_j^d = G(\widehat{DailyEnergy}^d Calendar^d, \qquad \text{(Equation 25)}$$
$$Weather_j^d, Solar_j^d, Economics_j^d) + w_j^d$$

where:

$DailyEnergy^d$ is the sum of the 15-minute loads on day (d);

$\widehat{DailyEnergy}^d$ is the predicted daily energy computed from the daily energy model;

$Load\_15\ Minute_j^d$ is the load for the 15-minute time interval (j) and day (d);

$Calendar^d$ is a set of binary variables that indicate the day-of-the-week, season, and observance of public holidays;

$Weather_j^d$ is a set of heating degree day and cooling degree day temperature variables that capture current and lagged weather conditions;

$Solar_j^d$ is a set of solar variables that indicate the time of the sunrise and sunset and adjustments for observance of Day Light Savings; and $Economics_j^d$ is a set of time series variables that capture underlying growth trends and operating schedules FIG. 14 shows the five-minute daily load shapes for a typical utility system. In one example, the ramp rate model is configured to capture systematic changes in loads that are lost in the noise when models are estimated using load levels. The graph shows all of the data for one month plus the average load shape across the month (the darker line) and days within the month (the lighter lines). These data show a large variation in the load shapes across the days, ranging from a low of approximately 1,000 MW to a high of 2,500 MW. This reflects variations due to day-of-the-week (e.g., weekdays versus weekends) and weather conditions. The near-term and short-term models may be designed to predict the 1,500 MW day-to-day load swings seen in this example.

Figure 15:
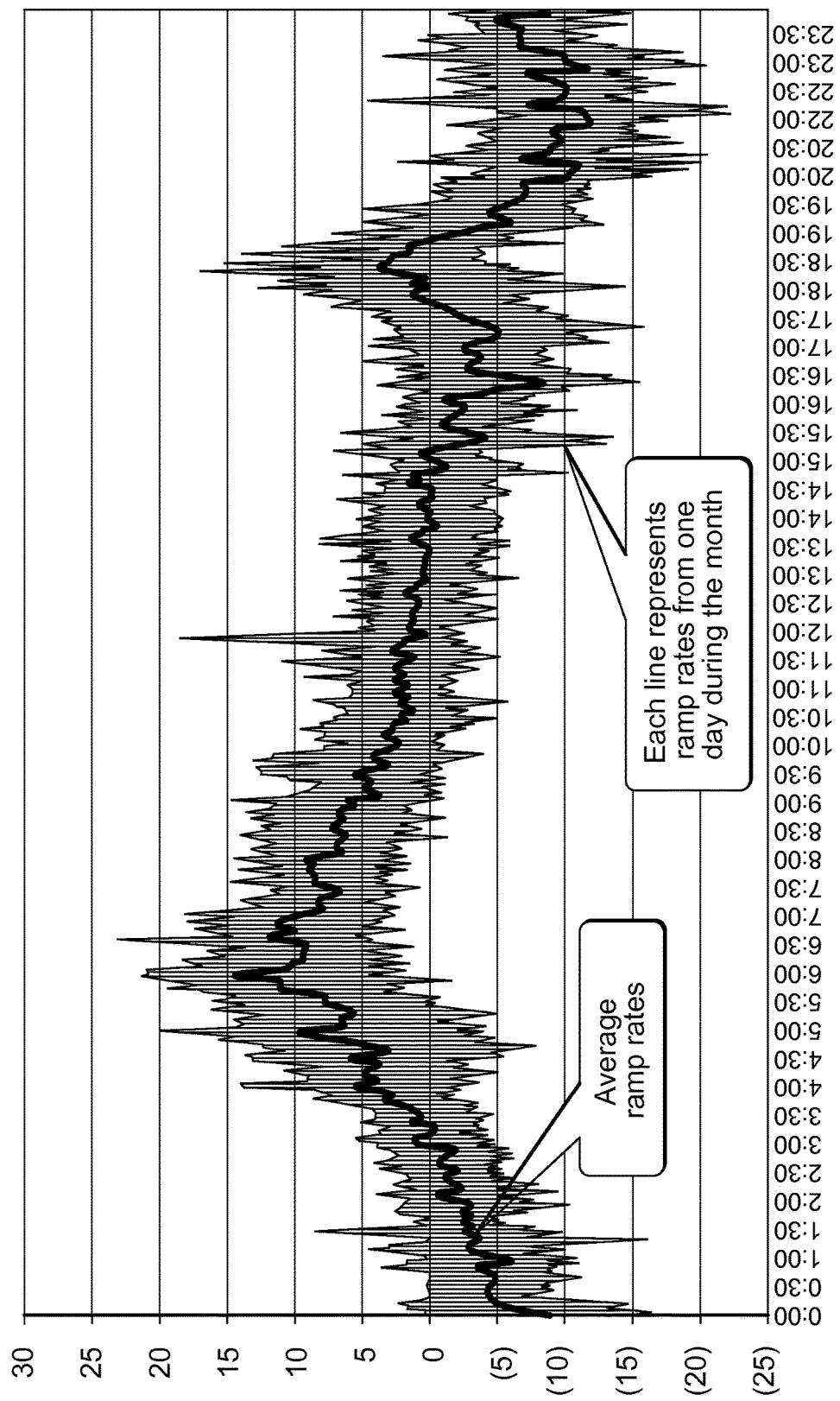
FIG. 15 is a graph illustrating ramp rates corresponding to FIG. 14, along with the average ramp rate shape for these data.

FIG. 15 shows example corresponding ramp rates along with the average ramp rate shape for these data. The average ramp rate shape captures changes in loads that consistently occur across the days. For example, a 10 MW swing in loads that consistently occurs from 8:00 a.m. to 8:05 a.m. will be captured by a ramp rate model, but is not significantly large enough to be distinguished from the overall noise in the load level models. By using the ramp rate model to bridge the gap between the end of the near-term forecast and the beginning of the short-term forecast, consistent ramp rate changes are maintained.

In an example where the ramp rate model is composed of 288 regression equations, it may have the following general form:

$$RampRate_t^d = G(Calendar^d, Weather_t^d, Solar_t^d) + v_t^d \qquad \text{(Equation 26)}$$

where:

$RampRate_t^d$ is the five-minute ramp rate at time interval (t) on day (d);

$Calendar^d$ is a set of binary variables that indicate the day-of-the-week, season, and observance of public holidays;

$Weather_t^d$ is a set of heating degree day and cooling degree day temperature variables that capture current and lagged weather conditions; and $Solar_t^d$ is a set of solar variables that indicate the time of the sunrise and sunset and adjustments for observance of Day Light Savings.

The near-term, ramp rate, and short-term models form the basic building blocks of the unified near-term and short-term load forecasting framework. Outlined below is the method used to stitch together the forecasts from these three models to form a single contiguous forecast that can be used to support both day-ahead generation scheduling and real-time system operations.

In one example, the utility of the near-term forecast in the forecast horizon may be determined (e.g., how far into the forecast horizon should the near-term forecast be used?). In one example of this determination involves constructing a sequence of highly autoregressive forecast models for selected periods of the day. The sequence of forecast models for loads at time (T) can be expressed as follows:

5-Minute Ahead Forecast Model:

$$Load_T = a_0 + \Sigma_{j=1}^{24} a_j Load_{T-j} \qquad \text{(Equation 27)}$$

10-Minute Ahead Forecast Model:

$$Load_T = a_0 + \Sigma_{j=2}^{24} a_j Load_{T-j} \qquad \text{(Equation 28)}$$

15-Minute Ahead Forecast Model:

$$Load_T = a_0 + \Sigma_{j=3}^{24} a_j Load_{T-j} \qquad \text{(Equation 29)}$$

75-Minute Ahead Forecast Model:

$$Load_T = a_0 + \Sigma_{j=15}^{24} a_j Load_{T-j} \qquad \text{(Equation 30)}$$

Table 1 shows an example of a sequence of forecast model MAPEs (mean absolute percent errors) by length of the forecast horizon for a theoretical large system load. The columns represent the target forecast period. The rows represent the length of the forecast horizon, for example the row labeled "5 Min Ahead" contains the 5-minute ahead forecast MAPEs. The boxes including bold-face type represent the forecast horizon at which the forecast MAPE from the autoregressive model exceeds the forecast MAPE for the corresponding short-term forecasting model. In this example, the forecast MAPE for loads at 8:00 a.m. from the short-term forecast model is 1.01%. For forecast horizons of longer than 35 minutes ahead, this implies that it would be better to use the forecast from the short-term model.

TABLE 1

Forecast MAPEs by Length of Lag Structure (with forecast horizon values in bold)

|  | 4:00 AM | 8:00 AM | 10:00 AM | 3:00 PM | 6:00 PM | 8:00 PM |
|---|---|---|---|---|---|---|
| 5 Min Ahead | 0.33% | 0.31% | 0.30% | 0.30% | 0.30% | 0.34% |
| 10 Min Ahead | 0.47% | 0.39% | 0.41% | 0.39% | 0.48% | 0.49% |
| 15 Min Ahead | 0.52% | 0.45% | 0.48% | 0.46% | 0.61% | 0.60% |
| 20 Min Ahead | 0.57% | 0.60% | 0.54% | 0.54% | 0.71% | 0.71% |
| 25 Min Ahead | 0.61% | 0.77% | 0.58% | 0.60% | 0.89% | 0.89% |
| 30 Min Ahead | 0.69% | 0.83% | 0.62% | 0.65% | 0.98% | 0.98% |
| 35 Min Ahead | 0.79% | 0.95% | 0.66% | 0.68% | 1.14% | 1.12% |
| 40 Min Ahead | 0.88% | 1.02% | 0.68% | 0.70% | 1.34% | 1.28% |
| 45 Min Ahead | 0.95% | 1.11% | 0.74% | 0.72% | 1.58% | 1.40% |
| 50 Min Ahead | 1.08% | 1.22% | 0.82% | 0.80% | 1.67% | 1.59% |
| 55 Min Ahead | 1.17% | 1.27% | 0.86% | 0.84% | 1.71% | 1.68% |
| 60 Min Ahead | 1.26% | 1.33% | 0.88% | 0.85% | 1.83% | 1.81% |
| 65 Min Ahead | 1.31% | 1.38% | 0.92% | 0.89% | 1.91% | 1.90% |
| 70 Min ahead | 1.38% | 1.46% | 0.96% | 0.92% | 2.01% | 1.97% |
| 75 Min Ahead | 1.48% | 1.59% | 1.05% | 0.98% | 2.05% | 1.99% |
| Short-term Model | 1.15% | 1.01% | 0.87% | 0.96% | 1.11% | 0.97% |

The results illustrate that during periods of the day where the load shape is relatively stable (e.g., 10:00 a.m. through 3:00 p.m.), the most recent load data provide strong predictive power for relatively long forecast horizons. Conversely, during periods of the day marked by turning points in the load (e.g., 8:00 a.m., 6:00 p.m., and 8:00 p.m.), the most recent load data provides strong predictive power for relatively short forecast horizons. This implies that the forecast framework needs to be flexible in terms of defining the cross over point between the near-term and short-term forecasts for each period or blocks of periods of the day. In practice, the analysis presented in Table 1 may be conducted to determine the optimal forecast horizon for the near-term forecasts.

Figure 16:
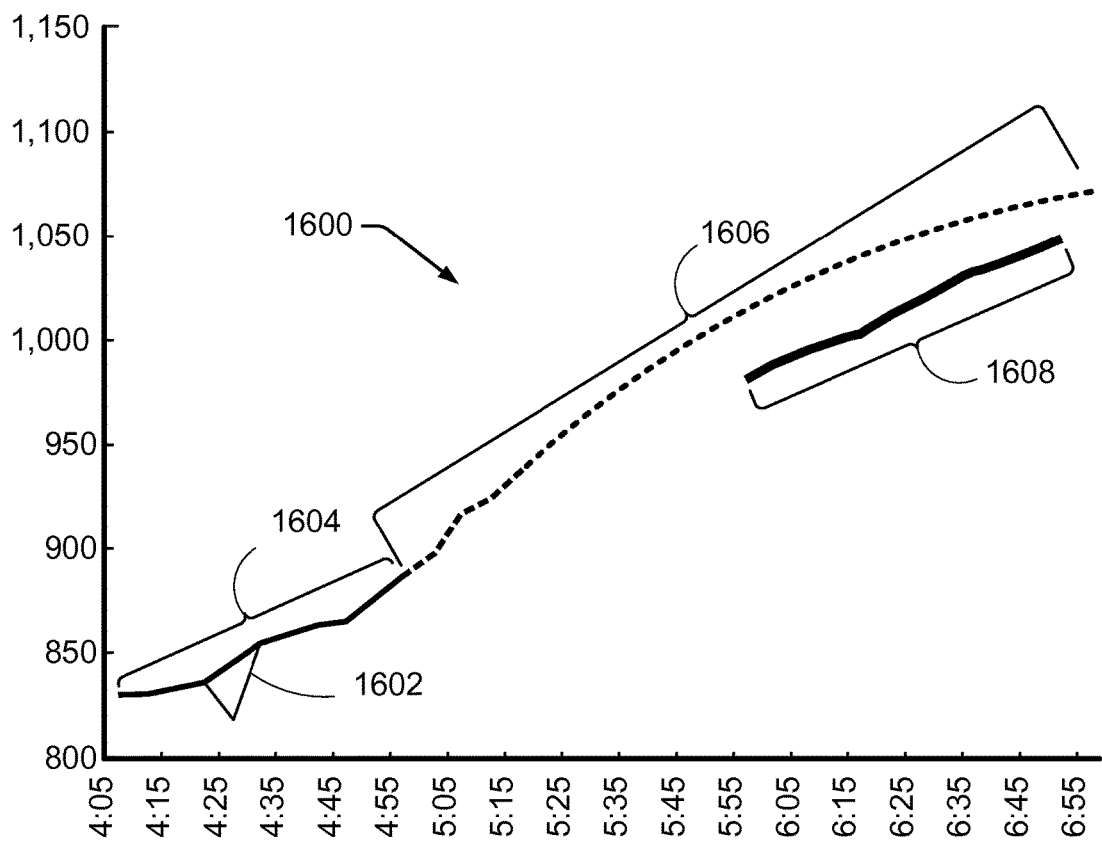
FIG. 16 is a graph illustrating an example of bridging a gap between near-term and short-term forecasts.

FIG. 16 shows a forecast 1600, including near-term and short-term portions. In particular, Supervisory Control and Data Acquisition (SCADA) data 1602 may include some variation and noise. Filtered and smoothed data 1604 may be obtained from the SCADA data 1602, such as by application of the two-stage Kalman filter and/or augmented Savitzky-Golay smoothing filter. Near-term forecast data 1606 may be disjoint and/or not continuous with respect to a short-term forecast 1608. Accordingly, FIG. 16 shows that a gap exists between the end of the near-term forecast horizon 1606 and the beginning of the short-term forecast 1608. By bridging the gap between the near-term and short-term forecasts, these two forecasting tools may be unified. The above analysis and techniques suggest that at some point in the forecast horizon, it is better to use the forecast results from the short-term models rather than the results from the autoregressive models. While this sounds straightforward, in practice, the two alternative forecasts rarely line up at a crossover and/or transition point. Example techniques to produce such a blended forecast are discussed with respect to FIG. 17.

Figure 17:
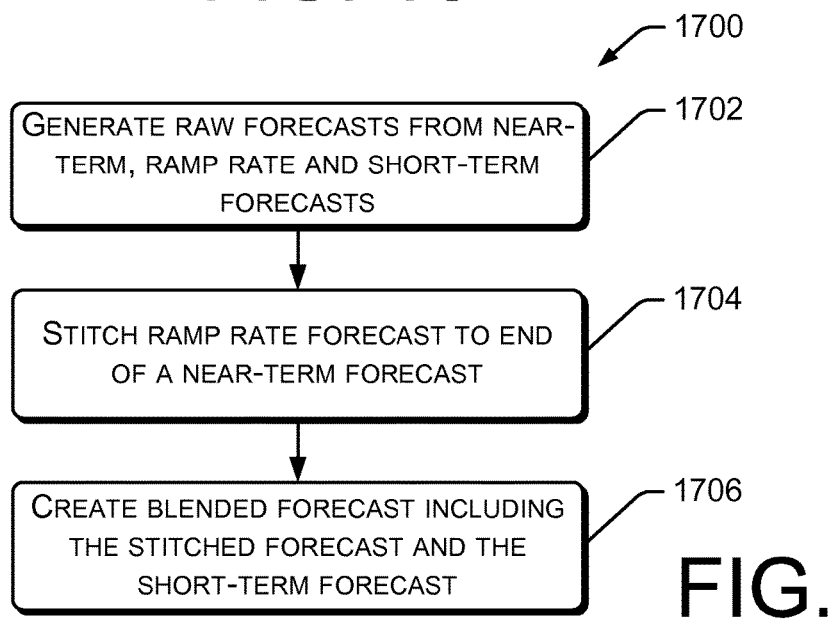
FIG. 17 is a flow diagram illustrating example techniques of unified near-term and short-term forecasting.

FIG. 17 shows example techniques 1700, including operation of a unified forecast framework, which are designed to produce a single load forecast. The example techniques may comprise a method of producing a unified near-term and short-term system load forecast for electrical generation scheduling and dispatching and for managing a spinning reserve of an electrical grid or system. Accordingly, the techniques resolve the discontinuity and/or gap seen in FIG. 16. The example techniques blend characteristics of a plurality of models, which may include: an autoregressive near-term forecast model; a ramp rate model; and a short-term forecast model with weather responsiveness. Thus, FIG. 17 shows an example 1700 of specific calculations that may be used to unify the forecast framework.

At operation 1702, raw forecasts may be generated. The raw forecasts may begin with the calculations based on near-term, ramp rate, and short-term models. Examples of these models include:

$$\widehat{LL}_{t+h}^{NT} = \text{NearTermModelForecast}_{t+h} \quad \text{(Equation 31)}$$

$$\widehat{RR}_{t+h+j}^{RR} = \text{RampRateModelForecast}_{t+h+j} \quad \text{(Equation 32)}$$

$$\widehat{LL}_{t+h+j+k}^{ST} = \text{ShortTermModelForecast}_{t+h+j+k} \quad \text{(Equation 33)}$$

In the near-term model, $\widehat{LL}_{t+h}^{NT}$ is the five minute load forecast generated using actual loads through time (t) for time period (t+h) in the forecast horizon derived from the near-term forecast model. The length of the near-term forecast horizon is indexed by (h).

In the ramp rate model, $\widehat{RR}_{t+h+j}^{RR}$ is the five minute ramp rate forecast for time period (t+h+j) derived from the ramp rate model. The ramp rate forecast is stitched onto the end of the near-term forecast horizon indexed by (h) and then runs the length of the ramp rate forecast horizon indexed by (j).

In the short-term model, $\widehat{LL}_{t+h+j+k}^{ST}$ is the load forecast for time period (t+h+j+k) derived by spreading the load forecast derived from the short-term model to the five minute level of load resolution. A set of polynomial spreading weights are used to spread the higher resolution load forecast to the five minute level. The weights depend on the time of the day to reflect the different ramping characteristics of a typical load day. The length of the short-term forecast horizon is indexed by (k).

Figure 18:
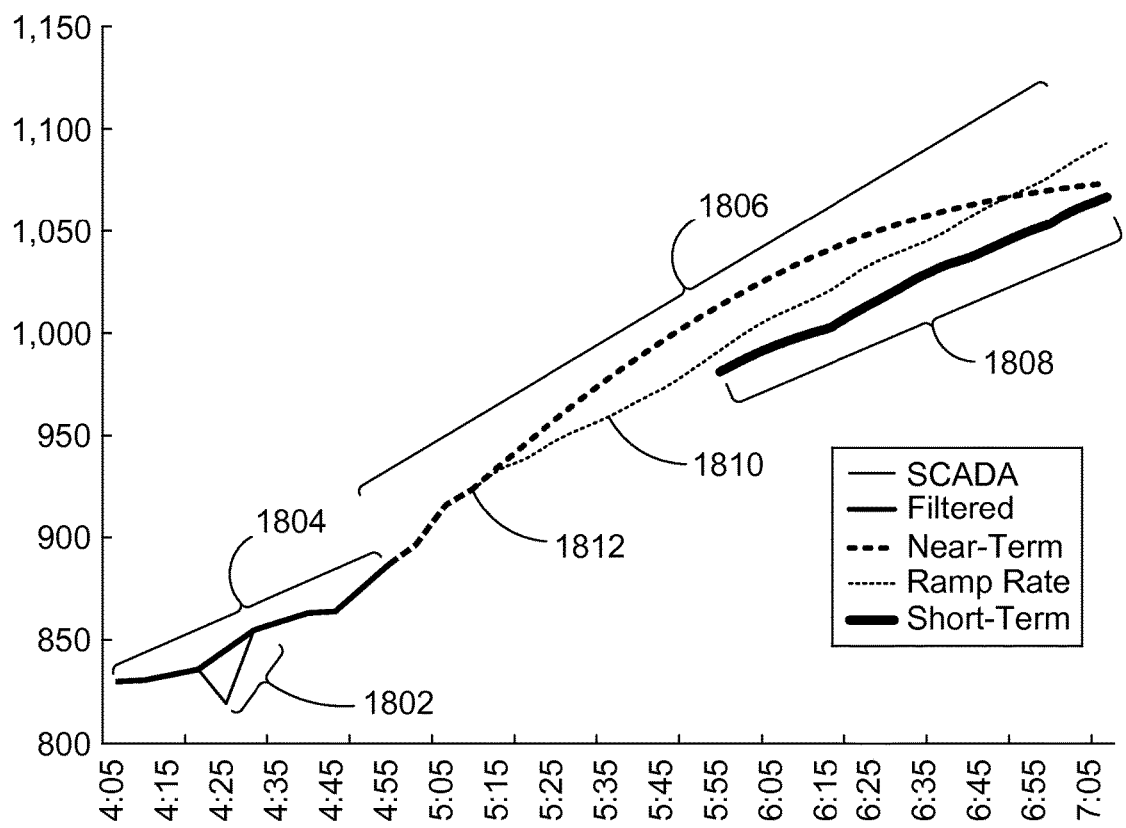
FIG. 18 is a graph illustrating example aspects of stitching the ramp rate forecast onto a near-term forecast.

At operation 1704, one or more ramp rate forecast intervals are stitched to the end of the near-term forecast horizon. Example results of this operation are seen at FIG. 18. The result is a stitched and/or load forecast that overlaps with the short-term forecast horizon. Such a forecast may contain nuisances in load levels that may be lost in the noise with the near-term and short-term load level models. Example ramp rate forecast models may be based on the equations $$\overline{LL}_{t+h}^{RR} = \widehat{LL}_{t+h}^{NT} \forall h \leq H \quad \text{(Equation 34)}$$

$$\overline{LL}_{t+H+j}^{RR} = \widehat{LL}_{t+h}^{NT} + \Sigma_{j=}^{J} \widehat{RR}_{t+H+j}^{RR} \quad \text{(Equation 35)}$$

In these example models, $\overline{LL}_{t+h+j}^{RR}$ is equal to the near-term forecast for forecast horizons less than or equal to the near-term forecast horizon indexed by H. $\overline{LL}_{t+h+j}^{RR}$ is also equal to the forecasted load resulting from stitching the ramp rate forecasts to the end of the near-term forecast horizon (t+H).

In a particular example, let the near-term forecast horizon extend 15-minutes ahead (of the present time) and the start of the short-term forecast horizon be one hour ahead. In this case, $\overline{LL}_{t+h+j}^{RR}$ equals the forecast derived from the near-term forecast model for the forecast horizon of five minutes ahead, ten minutes ahead, and fifteen minutes ahead. $\overline{LL}_{t+h+j}^{RR}$ then takes the value of the forecasted ramp rate for twenty minutes ahead stitched onto the fifteen minutes ahead load forecast from the near-term forecast model. The stitched forecast then runs out through the balance of the short-term forecast horizon. In this case, H equals three (3), and therefore represents the first 15-minutes represented as three five-minute intervals, and J represents the end of the short-term forecast horizon. The process of stitching the ramp rate forecast onto the end of the near-term forecast is illustrated in FIG. 17.

FIG. 18 shows aspects of operation 1704, including an example of stitching the ramp rate forecast onto the near-term forecast. In the example shown, Supervisory Control and Data Acquisition (SCADA) data 1802 includes some variation and noise. Variation and noise is removed from filtered and smoothed data 1804, such as by operation of the two-stage Kalman filter and/or augmented Savitzky-Golay smoothing filter. The near term forecast 1806 extends beyond the filtered data 1804, while the short-term forecast 1808 is separated from other data/forecasts by a gap. Additionally, operation 1704 (above) has stitched the ramp rate forecast 1810 onto the near term forecast 1806. In one example, a point 1812 at which the ramp rate model 1810 is stitched to the near-term model 1806 is at a location wherein the explanatory power of the most recent loads becomes less important than predicted and/or known future calendar, solar, and weather conditions.

At operation 1706, a blended forecast is made. In this operation, the stitched load forecast resulting from operation 1704 may be blended with the short-term forecast from operation 1702 to form a single blended forecast. In one example, the blended forecast can be written:

$$LL\_Blended_{t+h+j+k} = \overline{LL}_{t+h+j+k}^{RR} \times Weight_{t+h+j+k} + \quad \text{(Equation 36)}$$
$$\left((1 - Weight_{t+h+j+k}) \times \widehat{LL}_{t+h+j+k}^{ST}\right)$$

(Equation 36)
where:
Weight$_{t+h+j+k}$=1.0, when (t+h+j+k)≤H+J 0≤ Weight$_{t+h+j+k}$≤1, when H+J<(t+h+j+k)≤H+J+ K Weight$_{t+h+j+k}$=0, when (t+h+j+k)>H+J+K.

In this example, Weight$_{t+h+j+k}$ is the weight placed on the stitched forecast computed in operation 1704 at h+j+k intervals into the forecast horizon. Beyond the first H+J intervals the Weight$_{t+h+j+k}$ will decay to a value of 0.0 following a logistic decay function. In one example, the Weight$_{t+h+j+k}$ is reduced (e.g., to 0.0) over a plurality of intervals.

In a further example, a point at which the autoregressive near-term model transitions to the ramp rate model within the blended model may be varied, and that variance may be a function of system load stability. A more stable load may result in utilization of the near-term model for more minutes into the forecast, while a less stable system load may result in utilization of the near-term model for fewer minutes into the forecast.

In some applications, the near-term forecast may have a horizon (e.g., a useful period) that extends approximately 10-minutes into the future when loads on the electrical grid are unstable and approximately 60-minutes when loads are relatively stable. The useful period of the stitched near-term and ramp rate forecasts (e.g., the stitched forecast horizon) may be between 30 and 60 minutes. The blended ramp rate forecast and short-term forecast may be applicable over a period of one to two hours ahead of the present. The short-term forecast may be used after this period, and has a horizon that is at least 2 hours ahead of the present.

Referring back to the example, the unified forecast may be equal to the near-term forecast for the first 15 minutes, then equal to the stitched ramp rate forecast for the next 45 minutes, then equal to a blended average between the stitched ramp rate and short-term forecast for the next 60 minutes, and then equal to the short-term forecast for forecast horizons longer than two hours. The blended or unified forecast that results from operation 1706 is illustrated in FIG. 18.

Figure 19:
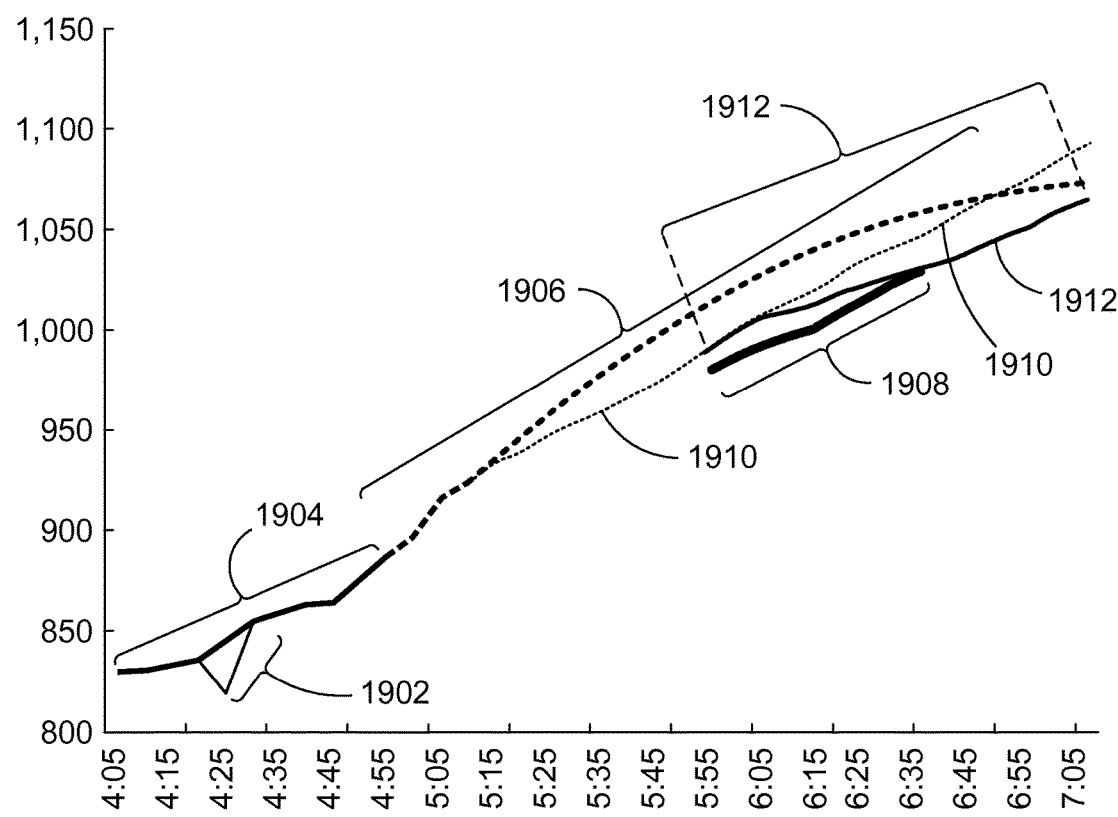
FIG. 19 is a graph illustrating an example of a unified (blended) forecast.

FIG. 19 provides an example of operation 1706, including an example of a unified (i.e., blended) forecast. In the example shown, SCADA data 1902 includes some variation and noise. Variation and noise is removed from filtered and smoothed data 1904. The near-term forecast 1906 extends beyond the filtered data 1904. The ramp rate forecast 1910 is stitched to the near-term forecast 1906. The short-term forecast 1908 is separated from other data/forecasts by a gap. In operation 1706 (above), a blended forecast 1912 is created, by blending the stitched forecast (i.e., the near-term forecast 1906 stitched to ramp rate forecast 1910) and the short-term forecast 1908. Accordingly, a unified forecast is created, including near-term and ramp rate forecasts (stitched together), which are blended to the short-term forecast 1908.

Figure 20:
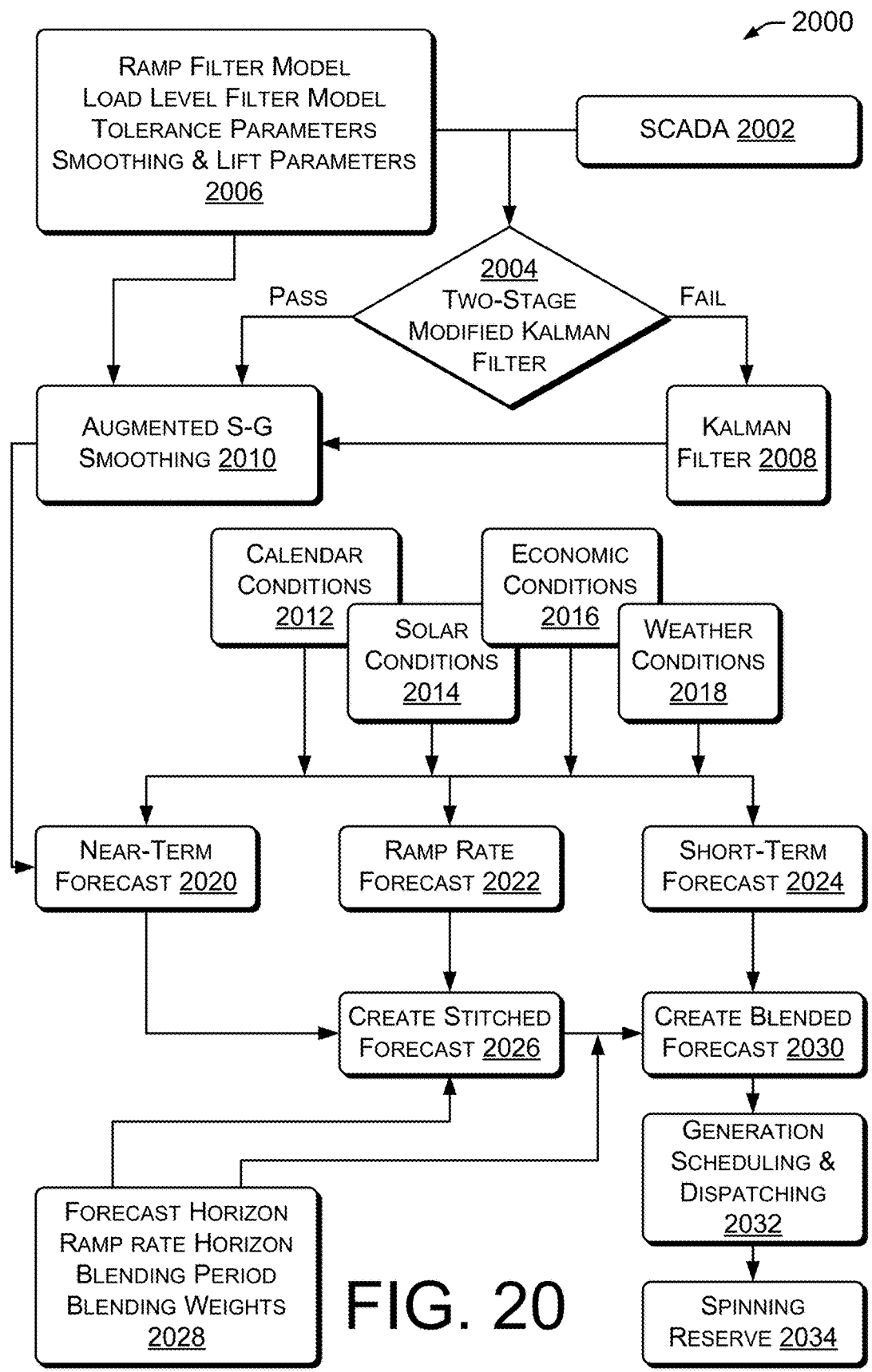
FIG. 20 shows a block diagram of an example unified near-term and short-term load forecast framework.

FIG. 20 shows an example unified near-term and short-term load forecast framework 2000. In the example shown, the work flow starts with the exogenously inputted SCADA data and ends with the blended forecast exported to downstream generation scheduling and dispatching applications. Such applications may be utilized to manage a spinning reserve. In the example, every (approximately) five minutes a new blended forecast is generated, such as by using the following example operations.

Within the framework 2000, the latest available five-minute load data is imported in from the upstream SCADA system 2002. The five-minute meter data are then validated by the two-stage modified Kalman filter 2004, using firstly the ramp rate filter test, and secondly the load level filter test. The ramp rate model, load level model and tolerance parameter settings (collectively, 2006, including smoothing and lift parameters provided to the augmented Savistky-Golay filter 2010) are supplied exogenously to the two-stage modified Kalman filter 2004. Data values (e.g., from the SCADA 2002) that pass both the ramp rate and load level filter tests (of the two-stage modified Kalman filter 2004) are then passed through to the augmented Savistky-Golay filter 2010 for data smoothing. Data values that fail the ramp rate filter test and/or the load level filter test (at the two-stage modified Kalman filter 2004) are replaced with the predicted value from the Kalman filter 2008. The data (from either the two-stage modified Kalman filter 2004 or the Kalman filter 2008) are passed through to the augmented Savitsky-Golay filter 2010. Some model maintenance tasks may require attention, e.g., periodically or as-needed. On an as-needed basis, the ramp rate filter and load level filter models 2006, near-term forecast 2020, ramp rate forecast 2022, and short-term forecast models 2024 may be re-estimated.

The augmented Savistky-Golay filter 2010 is then used to smooth the data. The Savistky-Golay smoothing and lift parameters are supplied exogenously to the Savistky-Golay filter 2010. The lift parameters may be updated daily, as a maintenance task. For example, at the end of each calendar day, the lift factors may be updated using the load data from that day. The smoothed data are then passed to the near-term forecast model 2020.

Forecasts and/or data from the prevailing calendar 2012, solar 2014, and economic conditions 2016 and/or weather 2018 may be supplied exogenously to the near-term forecast model 2020, the ramp rate forecast model 2022 and/or the short-term forecast model 2024. Thus, models 2020-2024 generate separate forecasts, including respectively: (1) the near-term load forecast, (2) the ramp rate forecast, and (3) the short-term forecast.

At operation 2026, a stitched forecast is created, at least in part from combination of the near-term forecast 2020 and the ramp rate forecast 2022.

At operation 2030, the stitched forecast from operation 2026 and the short-term forecast from operation 2024 are then blended together using a blending period and blending weights that are supplied exogenously from operation 2028.

The blended forecast may be exported to one or more downstream generation scheduling and dispatching applications 2032, which may be used as control and/or input to manage a spinning reserve 2034.

Example Methods

Figure 21:
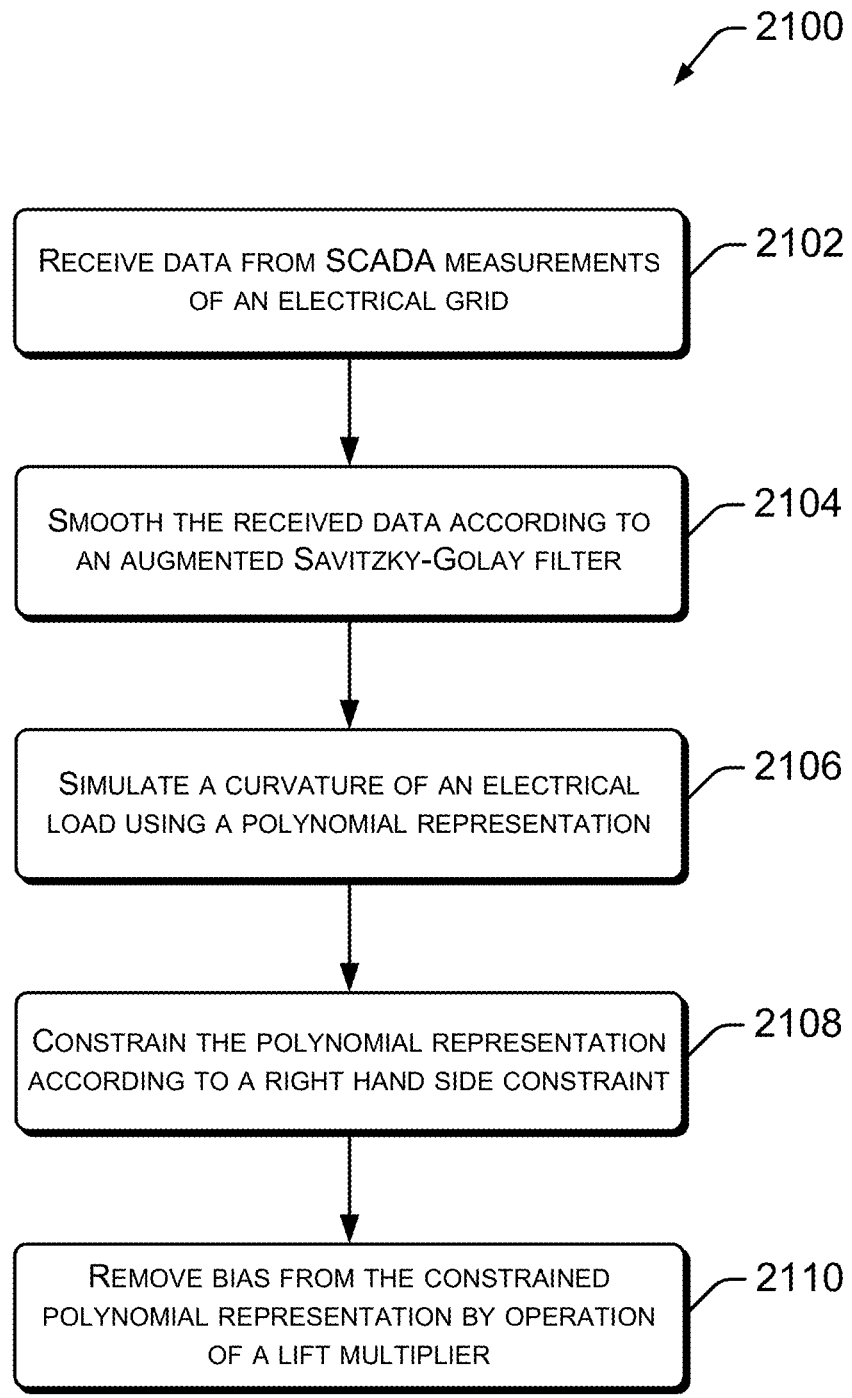
FIG. 21 is a flow diagram illustrating example techniques of data filtering and smoothing.
Figure 22:
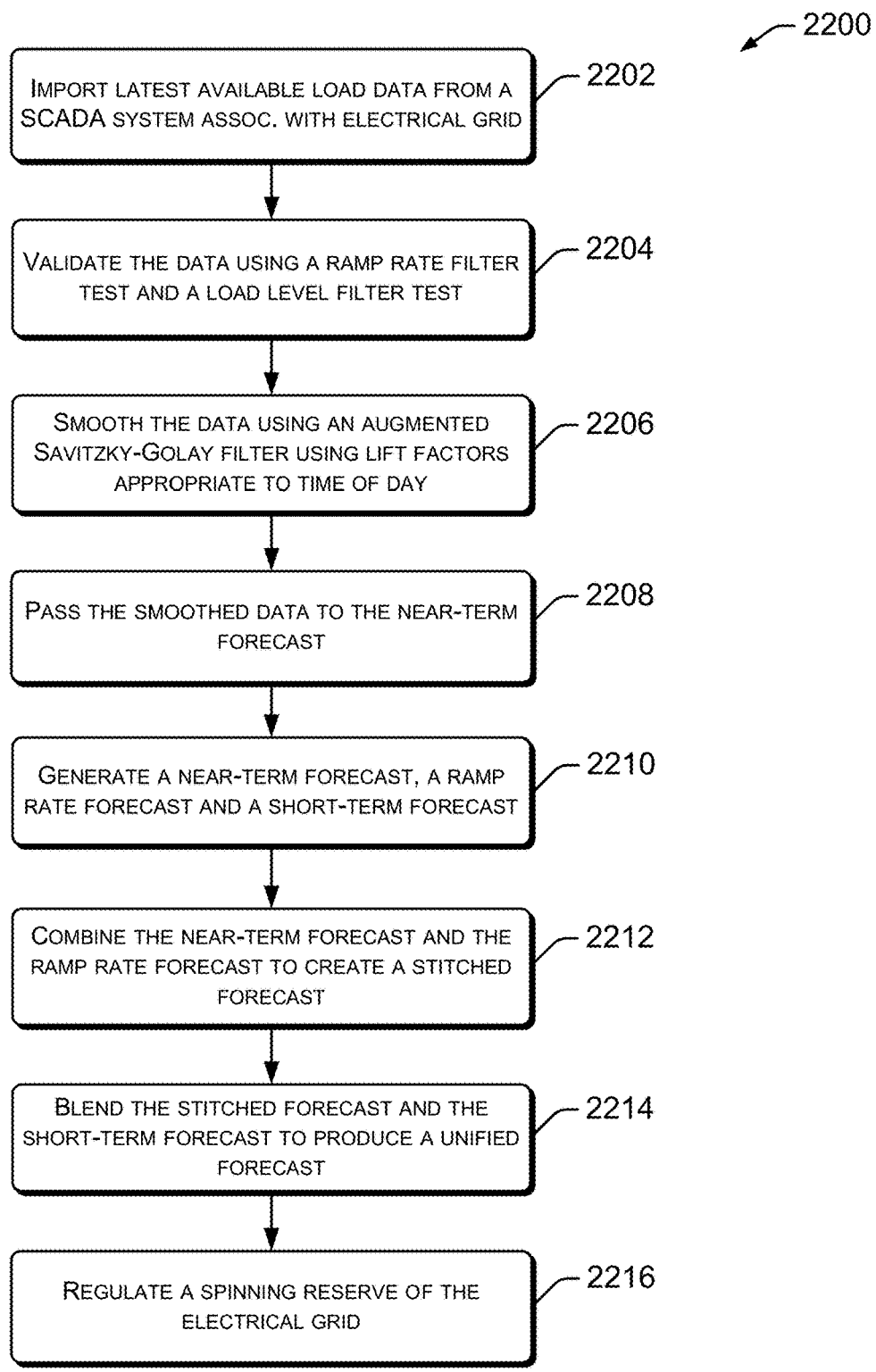
FIG. 22 is a flow diagram illustrating example techniques of unified near-term and short-term forecasting.

The techniques of FIGS. 1-20 may be implemented at least in part by the methods shown in FIGS. 21 and 22. However, FIGS. 21 and 22 contain general applicability, and are not limited by other drawing figures and/or prior discussion. Each method described herein is illustrated as a collection of acts, blocks or operations in a logical flow graph, which represent a sequence of operations that can be implemented in hardware, software, or a combination thereof.

Referring to FIGS. 21 and 22, the operations represent computer-executable instructions stored on one or more computer-readable storage media that, when executed by one or more processors, perform the recited operations. Such storage media, processors and computer-readable instructions can be located within a system (e.g., central office 102, which may include a processor 112 and memory 114 as shown in the example of FIG. 1) according to a desired design or implementation, and may store instructions and/or logic in a non-transitory manner. The storage media may comprise storage media generally, both removable and non-removable, and of any technology. Thus, the recited operations represent actions, such as those described in FIGS. 21 and 22, and are taken under control of one or more processors configured with executable instructions to perform actions indicated. Generally, computer-executable instructions include routines, programs, objects, components, data structures, and the like that perform particular functions or implement particular abstract data types. The order in which the operations are described is not intended to be construed as a limitation, and the described operations may be combined in different orders and/or in parallel to implement the method. The above discussion may apply to other methods described herein.

Additionally, for purposes herein, a computer-readable media may include all or part of an application specific integrated circuit (ASIC) or other hardware device (e.g., a gate array). Accordingly, within such an integrated circuit, one or more processors are configured to enact the techniques discussed herein, which may be defined by logic, transistors or other components, or on-board memory.

FIG. 21 shows an example of data smoothing, and particularly an example of use of an augmented Savitzky-Golay filter having a lift multiplier that results in a better fit to data. For example, the lift multiplier may result in a better fit when a bias has been introduced to data, such as by a constrained Savitzky-Golay equation. The Savitzky-Golay equation may be constrained because data for points immediately before the forecast are not available.

At operation 2102, data is received from SCADA measurements of an electrical grid. At operation 2104, the data are filtered and smoothed. In one example, the data are filtered by a two-stage Kalman filter, such as discussed with respect to FIGS. 5-8. In a further example, the data are smoothed by an augmented Savitzky-Golay smoothing filter, such as discussed at FIGS. 9-12. In the example, the augmentation provides a lift multiplier to compensate for constraint of the constrained Savitzky-Golay equation (s).

At operation 2106, curvature of an electrical load is simulated using a polynomial representation. The representation may be made according to the Savitzky-Golay example. At operation 2108, the polynomial representation is constrained according to a right hand side constraint. For example, if the forecast is for 8:20 am, then data for 7:55am, 8:00 am and 8:05 am may be available, but data for 8:10 am and 8:15 am may be unavailable. At operation 2110, bias is removed from the constrained polynomial representation by operation of a lift multiplier. In the example of FIG. 11, the lift multiplier compensates for bias in the Savitzky-Golay equation, resulting in a better data fit. Such data are better suited (than Savitzky-Golay without augmentation) for use in near-term models, and the forecasts from such models may be used in generation scheduling and management of a spinning reserve.

FIG. 22 shows an example of a unified framework for near-term and short-term electrical load forecasting. The example stitches ramp rate forecasts to the end of a near-term forecast, and then blends the stitched forecast with a short-term forecast. Beyond the point at which the ramp rate forecast(s) are attached to the near-term forecast, longer term factors such as the weather and the day of the week have more predictive power than highly autoregressive models used in the near-term.

At operation 2202, the latest available load data is imported from a SCADA system associated with an electrical grid. At operation 2204, the data are validated using a ramp rate filter test and a load level filter test. In one example, the data are filtered by a two-stage Kalman filter, such as discussed with respect to FIGS. 5-7. At operation 2206, the data are smoothed using an augmented Savitzky-Golay filter, which may employ lift factors appropriate for the time of day. In the example of FIGS. 9-12, lift factors associated with the augmented Savitzky-Golay smoothing filter are based on a number of inputs, such as time of day, day of week, etc. The lift factors may be based on a ratio of Savitzky-Golay equations, such as a ratio a centered equation and a constrained equation (e.g., equation 22).

At operation 2208, smoothed data (e.g., smoothed by the Savitzky-Golay filter) is passed to the near-term forecast. At operation 2210, near-term forecast, ramp rate forecast and short-term forecast are generated.

At operation 2212, ramp rate forecast(s) are stitched to a point in the near-term forecast, thereby creating a stitched or combined forecast. At operation 2214, the stitched forecast is blended to the short-term forecast. The resulting blended forecast represents a unified model for use in near-term and short-term forecasting. Examples of operations 2212 and 2214 are seen in FIGS. 16, 18 and 19. At operation 2216, a spinning reserve may be regulated using the blended forecast.

Conclusion

The forecast framework presented here addresses two key challenges to system load forecasting: (1) data filtering to smooth the most recent SCADA reads to prevent load spikes and random load noise from echoing into the forecast horizon, and (2) developing accurate near-term and short-term forecasts given forecasts of calendar, solar, economic, and weather conditions. This general forecast framework may be made specific to each system, through the process of specifying and estimating one or more of: statistical models used to drive the two-stage modified Kalman filter; lift multipliers for the augmented Savitzky-Golay filter; near-term load forecasting model; ramp rate forecasting model; and/or short-term forecasting model.

The framework works well for large, relatively stable systems where the short-term models can capture the influence of calendar, solar and weather conditions on the loads. The framework also works well for small, relatively noisy systems or sub-regions of a larger system where the data filtering can provide smoothed load data to the forecast models.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions which, when executed, cause one or more processors to perform acts comprising:

importing data from a supervisory control and data acquisition (SCADA) system associated with an electrical grid;

validating the data using a ramp rate filter test and a load level filter test;

smoothing the data using an augmented Savitzky-Golay filter;

correcting the data for time periods of upward and downward bias introduced by the smoothing of the data by using lift factors selected based on a time of day, wherein different lift factors are computed for each day of the week and the lift factors are related according to:

$$L_t^{Lift\ SG} = L_t^{RHS\ SG} \times Lift_t$$

wherein:

$(L_t^{Lift\ SG})$ is based at least in part on the augmented Savitzky-Golay filter;

$(L_t^{RHS\ SG})$ is based at least in part on a right-hand-side constrained Savitzky-Golay smoothing filter; and $(Lift_t)$ is a factor based at least in part on time period (t);

generating a near-term forecast, a ramp rate forecast and a short-term forecast;

passing the data to one or more of the near-term forecast, the ramp rate forecast or the short-term forecast;

combining the near-term forecast and the ramp rate forecast to create a stitched forecast;

blending the stitched forecast and the short-term forecast to produce a unified forecast; and regulating a spinning reserve of the electrical grid, wherein the regulating is based at least in part on the unified forecast, and wherein regulating the spinning reserve comprises at least one of increasing power that is available from one or more generators that are providing power to the electrical grid, or decreasing power that is available from the one or more generators that are providing power to the electrical grid.

2. The one or more non-transitory computer-readable media of claim 1, additionally comprising:

updating the lift factors using additional load data; and re-estimating the near-term forecast, the ramp rate forecast and the short-term forecast.

3. The one or more non-transitory computer-readable media of claim 1, wherein smoothing the data comprises:

smoothing the data using the augmented Savitzky-Golay filter using a moving-average window having a size that is a function of expected load changes.

4. The one or more non-transitory computer-readable media of claim 1, wherein smoothing the data comprises:

calculating the lift factors as a ratio of smoothed load from a centered Savitzky-Golay moving average to a right hand side constrained Savitzky-Golay moving average.

5. The one or more non-transitory computer-readable media of claim 1, wherein the combining comprises:

stitching a plurality of ramp rate forecasts to an end of the near-term forecast.

6. The one or more non-transitory computer-readable media of claim 1, wherein the combining comprises:

using forecast horizon parameters and ramp rate horizon parameters to create the stitched forecast.

7. The one or more non-transitory computer-readable media of claim 1, wherein the combining comprises:

stitching at least one ramp rate forecast to a horizon of the near-term forecast, wherein the stitching bridges a gap between the near-term forecast and short-term forecast, and wherein the near-term forecast is autoregressive and the short-term forecast is non-autoregressive.

8. The one or more non-transitory computer-readable media of claim 1, wherein the blending comprises:

reducing blending weights to zero over a blending period, wherein the blending weights are used in an equation that includes terms associated with the ramp rate forecast and short-term forecast.

9. The one or more non-transitory computer-readable media of claim 1, wherein the unified forecast comprises:

an autoregressive portion that utilizes recent load information and a non-autoregressive portion that utilizes calendar and weather information.

10. A method of producing a unified near-term and short-term system load forecast, comprising:

under control of one or more processors configured with executable instructions:

receiving data of supervisory control and data acquisition (SCADA) measurements of an electrical grid;

smoothing the data;

correcting for time periods of upward and downward bias introduced by the smoothing of the data, wherein the correcting is performed by using lift factors selected based on a time of day and day of week, and wherein lift factors are updated using daily load data;
generating near-term and short-term forecasts based on the data;
stitching a ramp rate forecast to the near-term forecast to create a stitched forecast, wherein the stitching is performed using relationships, comprising:

$$\overline{LL}_{t+h}^{RR} = \widehat{LL}_{t+h}^{NT}, \forall\, h \leq H$$

$$\overline{LL}_{t+H+j}^{RR} = \widehat{LL}_{t+H}^{NT} + \sum_{j=1}^{J} \widehat{RR}_{t+H+j}^{RR}$$

wherein, $\overline{LL}_{t+h}^{RR}$ is a value from a load level ramp-rate forecast, $\widehat{LL}_{t+h}^{NT}$ is a load level near term forecast model, $\overline{LL}_{t+H+j}^{RR}$ is a value from a load level ramp-rate forecast, $\widehat{LL}_{t+H}^{NT}$ is a load level near-term forecast; $\widehat{RR}_{t+H+j}^{RR}$ is the ramp-rate forecast, t is a time, h is a time increment in the near-term forecast, H is a time period, j is a time increment in the ramp-rate forecast; and J is a period of time;
blending the stitched forecast to the short-term forecast to form the unified forecast; and
regulating a spinning reserve of the electrical grid using the unified forecast, wherein the regulating is based at least in part on the unified forecast, and wherein regulating the spinning reserve comprises at least one of increasing power that is available from one or more generators that are providing power to the electrical grid, or decreasing power that is available from the one or more generators that are providing power to the electrical grid.

11. The method as recited in claim 10, wherein the blending is performed using relationships, comprising:

$$\text{LL\_Blended}_{t+h+j+k} =$$
$$\overline{LL}_{t+h+j+k}^{RR} \times \text{Weight}_{t+h+j+k} + \left((1 - \text{Weight}_{t+h+j+k}) \times \widehat{LL}_{t+h+j+k}^{ST}\right)$$

wherein:
$\text{Weight}_{t+h+j+k} = 1.0$, when $(t+h+j+k) \leq H+J$
$0 \leq \text{Weight}_{t+h+j+k} \leq 1$, when $H+J < (t+h+j+k) \leq H+J+K$
$\text{Weight}_{t+h+j+k} = 0$, when $(t+h+j+k) > H+J+K$
wherein $\text{Weight}_{t+h+j+k}$ is weight placed on the stitched forecast computed h+j+k intervals into a forecast horizon; and
wherein $\text{LL\_Blended}_{t+h+j+k}$ is a blended forecast comprising elements of the stitched forecast and the short-term forecast, t is a time, h is a time increment in the near term forecast, H is a time period of the near term forecast, j is a time increment in the ramp rate forecast; J is a period of time of the ramp rate forecast, k is a time increment in the short term forecast, and K is a time period of the short term forecast.

12. The method as recited in claim 10, wherein:
the near-term forecast has a horizon that is between 10-minutes and 60-minutes ahead, and is based on load stability;
the stitched forecast has a horizon that is between 30 minutes and 60 minutes ahead; and
the unified forecast has a horizon that is at least two hours ahead.

13. The method as recited in claim 10, wherein the ramp rate forecast is configured using sigma values ($\hat{\sigma}_t^R$) that are obtained from a generalized autoregressive conditional heteroskedasticity (GARCH) forecast.

14. The method as recited in claim 10, wherein blending the ramp rate forecast to the short-term forecast to form a unified forecast comprises:
weighting a stitched forecast at intervals into a forecast horizon, wherein a weight is reduced to 0.0 over plurality of intervals.

15. The method as recited in claim 10, wherein blending the ramp rate forecast to the short-term forecast to form the unified forecast comprises:
bridging a gap between the near-term and short-term forecasts with a plurality of five-minute ramp rate forecasts.

16. The method as recited in claim 10, wherein blending the ramp rate forecast to the short-term forecast to form the unified forecast comprises:
varying a point at which a near-term forecast transitions to the ramp rate forecast within the unified forecast based on system load stability.

17. A system for producing a unified near-term and short-term system for load forecasting, comprising:
one or more processors configured with executable instructions to perform:
receiving data of supervisory control and data acquisition (SCADA) measurements of an electrical grid;
filtering the data according to a ramp rate filter test and a load level filter test;
smoothing the data according to an augmented Savitzky-Golay filter;
correcting for time periods of upward and downward bias introduced by the smoothing of the data, wherein the correcting is performed by lift multipliers selected based on a time of day, wherein the lift multipliers alter the data by a factor that is a function of time;
forecasting electrical demand on the electrical grid using the data and a unified forecast, wherein the unified forecast comprises a blending of:
a near-term forecast;
a ramp rate forecast extending beyond an endpoint of the near-term forecast; and
a short-term forecast, wherein the blending is performed using relationships, comprising:

$$\text{LL\_Blended}_{t+h+j+k} =$$
$$\overline{LL}_{t+h+j+k}^{RR} \times \text{Weight}_{t+h+j+k} + \left((1 - \text{Weight}_{t+h+j+k}) \times \widehat{LL}_{t+h+j+k}^{ST}\right)$$

wherein:
$\text{Weight}_{t+h+j+k} = 1.0$, when $(t+h+j+k) \leq H+J$
$0 \leq \text{Weight}_{t+h+j+k} \leq 1$, when $H+J < (t+h+j+k) \leq H+J+K$
$\text{Weight}_{t+h+j+k} = 0$, when $(t+h+j+k) > H+J+K$
wherein $\text{Weight}_{t+h+j+k}$ is weight placed on a forecast computed h+j+k intervals into a forecast horizon; and
wherein $\text{LL\_Blended}_{t+h+j+k}$ is a blended forecast comprising elements of the stitched forecast and the short-term forecast, t is a time, h is a time increment in the near term forecast, H is a time period of the near term forecast, j is a time increment in the ramp rate forecast; J is a period of time of the ramp rate forecast, k is a time increment in the short term forecast, and K is a time period of the short term forecast; and using the unified forecast to regulate a spinning reserve of the electrical grid, wherein the regulating is based at least in part on the unified forecast, and wherein regulating the spinning reserve comprises at least one of increasing power that is available from one or more generators that are providing power to the electrical grid, or by decreasing power that is available from the one or more generators that are providing power to the electrical grid.

18. The system as recited in claim 17, wherein the blending of the ramp rate forecast to the short-term forecast to form the unified forecast comprises:
    bridging a gap between the near-term and short-term forecasts with a plurality of five-minute ramp rate forecasts.

19. The system as recited in claim 17, additionally comprising:
    forecasting approximately 0-15 minutes into the future using the near-term forecast;
    forecasting approximately 15-60 minutes into the future using the ramp rate forecast extending beyond the near-term forecast;
    forecasting approximately 60-120 minutes into the future using the blending of the ramp rate forecast to the short-term forecast; and
    forecasting beyond approximately 120 minutes into the future using, at least in part, the short-term forecast.

* * * * *